United States Patent
Ikemiya et al.

(10) Patent No.: US 9,322,585 B2
(45) Date of Patent: Apr. 26, 2016

(54) SELF-DIAGNOSING TRANSPORT REFRIGERATING APPARATUS

(75) Inventors: Makoto Ikemiya, Osaka (JP); Masaaki Takegami, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 472 days.

(21) Appl. No.: 13/812,410

(22) PCT Filed: Jun. 27, 2011

(86) PCT No.: PCT/JP2011/003660
§ 371 (c)(1),
(2), (4) Date: Jan. 25, 2013

(87) PCT Pub. No.: WO2012/014374
PCT Pub. Date: Feb. 2, 2012

(65) Prior Publication Data
US 2013/0118195 A1 May 16, 2013

(30) Foreign Application Priority Data

Jul. 26, 2010 (JP) .................................. 2010-167124

(51) Int. Cl.
*F25B 49/00* (2006.01)
*F25D 29/00* (2006.01)
(Continued)

(52) U.S. Cl.
CPC .............. *F25B 49/00* (2013.01); *F25B 49/005* (2013.01); *F25D 21/006* (2013.01);
(Continued)

(58) Field of Classification Search
CPC .... B60H 1/00785; B60H 1/32; B60H 1/3207; B60H 1/321; B60H 3/024; B60H 2001/3244; B60H 1/00014; B60H 1/00264; B60H 1/3232; F25B 47/006; F25B 47/02; F25B 2347/023; F25B 2700/02; F25D 21/002; F25D 21/008; F25D 21/02; F25D 21/06; F25D 2317/0411; F25D 11/003; F24F 2011/009; F24F 3/1405; F24F 11/0015; F24F 2003/144; G05D 22/00; B60P 3/20
USPC ............ 62/81, 93, 151, 155, 156, 158, 176.1, 62/176.2, 176.6, 180, 239, 244, 272, 498; 236/44 A, 44 C
See application file for complete search history.

(56) References Cited

U.S. PATENT DOCUMENTS 4,574,871 A * 3/1986 Parkinson et al. ........... 165/11.1
5,231,868 A * 8/1993 Dick ................... G01M 3/3236
73/49.3

(Continued)

FOREIGN PATENT DOCUMENTS

CN 1124315 A 6/1996
JP 5-328886 A 12/1993
(Continued)

*Primary Examiner* — Jonathan Bradford
(74) *Attorney, Agent, or Firm* — Birch, Stewart, Kolasch & Birch, LLP

(57) ABSTRACT

A refrigerating apparatus includes a casing body attached to an opening formed at one end of a box-shaped cooling compartment so as to close the opening, a refrigeration cycle unit including a compressor and a radiator provided on an outer side of the cooling compartment relative to the casing body and an evaporator provided on an inner side of the cooling compartment relative to the casing body, a diagnosis process executer configured to control the refrigeration cycle unit to execute a diagnosis process for diagnosing a performance of the cooling compartment, and a performance determinator configured to determine the performance of the cooling compartment in the diagnosis process.

8 Claims, 13 Drawing Sheets

(51) Int. Cl.
*F25D 21/00* (2006.01)
*B60P 3/20* (2006.01)
*B60H 1/32* (2006.01)
*B60H 1/00* (2006.01)
*F25D 11/00* (2006.01)

(52) U.S. Cl.
CPC ......... *F25D 29/003* (2013.01); *B60H 1/00014* (2013.01); *B60H 1/00264* (2013.01); *B60H 1/3232* (2013.01); *B60P 3/20* (2013.01); *F25D 11/003* (2013.01)

(56) References Cited

U.S. PATENT DOCUMENTS

| | | | |
|---|---|---|---|
| 5,983,655 A * | 11/1999 | Kistner | B60H 1/3232 62/163 |
| 2005/0222715 A1 * | 10/2005 | Ruhnke et al. | 700/276 |
| 2006/0168972 A1 * | 8/2006 | Fry | 62/157 |
| 2006/0264221 A1 | 11/2006 | Koike et al. | |
| 2008/0148748 A1 | 6/2008 | Viegas et al. | |
| 2009/0133420 A1 * | 5/2009 | Kitamura | B60H 1/00514 62/259.1 |
| 2009/0294116 A1 * | 12/2009 | Kind | F24F 11/0001 165/246 |
| 2011/0030402 A1 | 2/2011 | Shinya et al. | |
| 2011/0126566 A1 * | 6/2011 | Jones et al. | 62/239 |

FOREIGN PATENT DOCUMENTS

| | | |
|---|---|---|
| JP | 9-96475 A | 4/1997 |
| JP | 9-210517 A | 8/1997 |
| JP | 9-210538 A | 8/1997 |
| JP | 2003-254645 A | 9/2003 |
| JP | 2003-254646 A | 9/2003 |
| JP | 2005-71295 A | 3/2005 |
| JP | 2009-52833 A | 3/2009 |
| JP | 2010-71627 A | 4/2010 |

\* cited by examiner

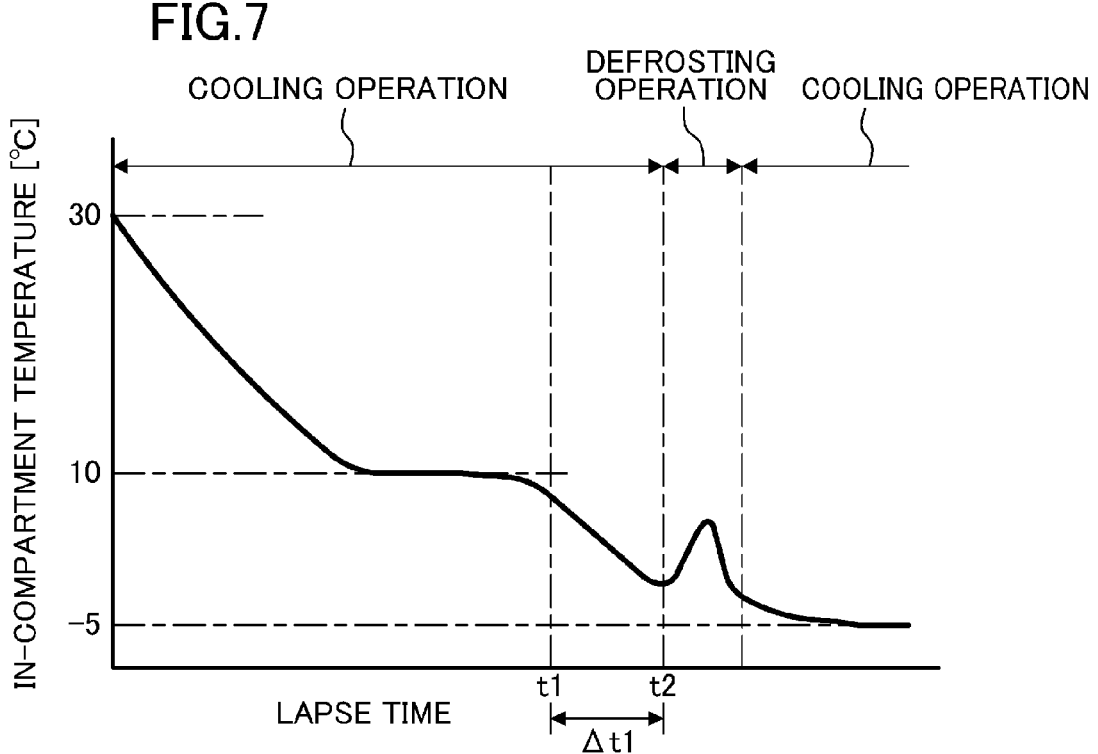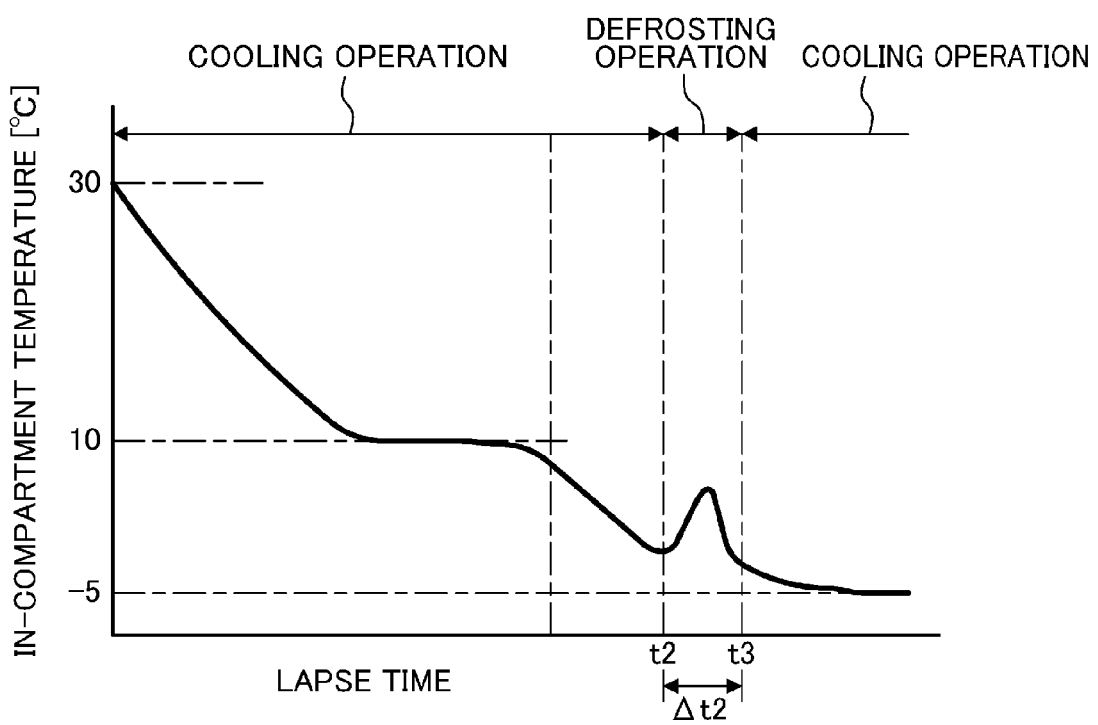

SELF-DIAGNOSING TRANSPORT REFRIGERATING APPARATUS

TECHNICAL FIELD

The present invention relates to a refrigerating apparatus which is attached to an opening of a cooling compartment in which an object(s) to be cooled is stored and which is configured to cool an inside of the cooling compartment.

BACKGROUND ART

Conventionally, a refrigerating apparatus configured to cool an inside of a compartment such as a container used for, e.g., marine transportation or a trailer used for, e.g., ground transportation has been known. For example, Patent Document 1 discloses the refrigerating apparatus (trailer refrigerating apparatus) of this type. The refrigerating apparatus includes a casing body attached to an opening of a trailer of a refrigerated vehicle, and a refrigeration cycle unit supported by the casing body. The refrigeration cycle unit forms a refrigerant circuit configured to perform a vapor compression refrigeration cycle. Specifically, the refrigeration cycle unit includes a compressor, a radiator, an expansion valve, and an evaporator. The compressor, the radiator, and the expansion valve are supported by the casing body so as to be positioned outside a cooling compartment (i.e., outside a compartment). The evaporator is supported by the casing body so as to be positioned inside the cooling compartment (i.e., inside the compartment).

An air path is formed inside the cooling compartment (trailer) such that air circulates through the evaporator. On the other hand, when refrigerant circulating through the refrigerant circuit passes through the evaporator, the refrigerant is evaporated by absorbing heat from in-compartment air. In such a manner, the in-compartment air of the trailer is cooled to store food etc.

CITATION LIST

Patent Document

PATENT DOCUMENT 1: Japanese Patent Publication No. 2009-052833

SUMMARY OF THE INVENTION

Technical Problem

In the foregoing refrigerating apparatus, the opening of the cooling compartment such as the trailer or the container is covered by the casing body, thereby hermetically closing the cooling compartment. That is, in such a manner that the casing body is attached to the cooling compartment, a clearance between the cooling compartment and the casing body is sealed, and therefore outside-compartment heat is prevented from entering the cooling compartment. In addition, packing etc. are attached to, e.g., a door of the cooling compartment or other clearance, and therefore outside-compartment heat is prevented from entering the cooling compartment. Moreover, in the cooling compartment such as the trailer or the container, a thermal insulator made of, e.g., foamed resin is used for wall surfaces etc. of the cooling compartment in order to maintain thermal insulating properties of the cooling compartment. That is, in the refrigerating apparatus of this type, energy saving properties of the entire apparatus are highly susceptible not only to a cooling capacity of the refrigerating apparatus but also to a performance (airtightness and a thermal insulating performance) of the cooling compartment.

However, in the refrigerating apparatus of this type, when the casing body is attached to the opening of the cooling compartment, if the attachment is insufficient, a clearance may be formed between the opening of the cooling compartment and the casing body, resulting in lowering of the airtightness of the cooling compartment. In addition, e.g., upon manufacturing of the cooling compartment, the thermal insulator may not be uniformly formed across the entirety of the wall surface, resulting in lowering of the thermal insulating performance. If the lowering of the airtightness or the thermal insulating performance of the cooling compartment occurs for the foregoing reasons, a disadvantage that the energy saving properties of the entire apparatus are degraded is caused even with a sufficient performance (cooling capacity) of the refrigerating apparatus.

The present invention has been made in view of the foregoing, and it is an objective of the present invention to provide a refrigerating apparatus configured to reduce or prevent degradation of energy saving properties due to lowering of airtightness or a thermal insulating performance of the cooling compartment.

Solution to the Problem

A first aspect of the invention is intended for a refrigerating apparatus including a casing body (21) attached to an opening (14) formed at one end of a box-shaped cooling compartment (11) so as to close the opening (14); a refrigeration cycle unit (30) including a compressor (31) and a radiator (32) provided on an outer side of the cooling compartment (11) relative to the casing body (21), and an evaporator (35) provided on an inner side of the cooling compartment (11) relative to the casing body (21); a diagnosis process executer (81) configured to control the refrigeration cycle unit (30) to execute a diagnosis process for diagnosing a performance of the cooling compartment (11); and a performance determinator (82) configured to determine the performance of the cooling compartment (11) in the diagnosis process.

In the first aspect of the invention, the casing body (21) of the refrigerating apparatus is attached to the opening (14) of the box-shaped cooling compartment (11). When the refrigeration cycle unit (30) is operated, refrigerant compressed in the compressor (31) circulates through a refrigerant circuit, thereby performing a refrigeration cycle. That is, refrigerant compressed in the compressor (31) dissipates heat to outdoor air in the radiator (32), and then the pressure of such refrigerant is reduced by, e.g., a predetermined pressure reduction mechanism. The refrigerant having the reduced pressure flows through the evaporator (35) provided inside the cooling compartment (11). In the evaporator (35), heat is exchanged between air in the cooling compartment (11) and the refrigerant, and the refrigerant is evaporated by absorbing heat from the air. In such a manner, the air in the cooling compartment (11) is cooled.

However, even when the inside of the cooling compartment (11) is cooled as described above, if lowering of airtightness or a thermal insulating performance of the cooling compartment (11) as compared to a potential performance of the cooling compartment (11) occurs due to some type of interference with the cooling compartment (11), the inside of the cooling compartment (11) is insufficiently cooled, resulting in degradation of energy saving properties. In particular, if attachment between the opening (14) of the cooling compartment (11) and the casing body (21) is insufficient, outdoor heat enters the compartment through part between the opening (14) and the casing body (21), and therefore a cooling effect of the inside of the cooling compartment (11) is significantly reduced. Thus, in the refrigerating apparatus of the present invention, the diagnosis process executer (81) controls the refrigeration cycle unit (30) so as to execute the diagnosis process. When the diagnosis process is performed, the performance determinator (82) determines the performance of the cooling compartment (11) based on predetermined determination conditions. Thus, it can be promptly recognized that the lowering of the airtightness or the thermal insulating performance of the cooling compartment (11) occurs due to some type of failure, and therefore a suitable action can be taken to deal with the foregoing situation.

A second aspect of the invention is intended for the refrigerating apparatus of the first aspect of the invention, in which the performance determinator (82) is configured to determine airtightness of the cooling compartment (11) in the diagnosis process.

In the second aspect of the invention, after the diagnosis process executer (81) executes the diagnosis process, the performance determinator (82) determines the airtightness of the cooling compartment (11) based on predetermined determination conditions. Thus, it can be promptly recognized that external air enters the compartment through, e.g., part between the casing body (21) and the opening (14), and a suitable action can be taken to deal with the entering of external air.

A third aspect of the invention is intended for the refrigerating apparatus of the second aspect of the invention, in which the refrigeration cycle unit (30) includes a defrosting start determinator (83) configured to start a defrosting operation of the evaporator (35) when an amount of frost on the evaporator (35) exceeds a predetermined amount, the diagnosis process executer (81) is configured to perform, upon start of the diagnosis process, a cooling operation for cooling an inside of the cooling compartment (11) by the evaporator (35), and the performance determinator (82) is configured to determine the airtightness of the cooling compartment (11) based on a time $\Delta t1$ between a predetermined point after start of the cooling operation and a point at which the defrosting start determinator (83) starts the defrosting operation.

In the third aspect of the invention, when the diagnosis process is started, the cooling operation for cooling the inside of the cooling compartment (11) by the evaporator (35) is performed. During the cooling operation, when the amount of frost on the evaporator (35) exceeds the predetermined amount, the defrosting start determinator (83) starts the defrosting operation for melting frost on the evaporator (35).

Suppose that a clearance is, during the cooling operation, formed at, e.g., the opening (14) of the cooling compartment (11), and outside-compartment air (external air) enters the cooling compartment (compartment) (11) through the clearance. In such a case, since moisture contained in the external air enters the compartment, frosting on a surface of the evaporator (35) is accelerated. Thus, in this case, the time $\Delta t1$ from the predetermined point after the start of the cooling operation to the start of the defrosting operation is shortened. As described above, the period from the start of the cooling operation to the transition to the defrosting operation is used as an indicator for the entering of external air into the compartment, i.e., for the airtightness of the cooling compartment (11). Thus, the performance determinator (82) determines the airtightness of the cooling compartment (11) based on the time $\Delta t1$.

A fourth aspect of the invention is intended for the refrigerating apparatus of the second aspect of the invention, which further includes a defrosting end determinator (85) configured to terminate a defrosting operation of the evaporator (35) when an amount of frost on the evaporator (35) falls below a predetermined amount during the defrosting operation. The diagnosis process executer (81) is configured to execute, upon start of the diagnosis process, a cooling operation for cooling an inside of the cooling compartment (11) by the evaporator (35) and the n execute the defrosting operation, and the performance determinator (82) is configured to determine the airtightness of the cooling compartment (11) based on a time $\Delta t2$ between a point at which the defrosting operation is executed and a point at which the defrosting end determinator (85) terminates the defrosting operation.

In the fourth aspect of the invention, when the diagnosis process is started, the cooling operation for cooling the inside of the cooling compartment (11) by the evaporator (35) is performed. After the cooling operation, the defrosting operation is performed to defrost the evaporator (35). During the defrosting operation, when the amount of frost on the evaporator (35) falls below the predetermined amount, the defrosting end determinator (85) terminates the defrosting operation.

Suppose that a clearance is, during the cooling operation, formed at, e.g., the opening (14) of the cooling compartment (11), and external air enters the compartment through the clearance. In such a case, since moisture contained in the external air enters the compartment, the amount of frost adhered to the surface of the evaporator (35) is increased. Thus, in this case, the time $\Delta t2$ from the execution of the defrosting operation to the termination of the defrosting operation by the defrosting end determinator (85) is extended. As described above, the period from the start of the defrosting operation to the termination of the defrosting operation is used as an indication for the entering of external air into the compartment, i.e., for the airtightness of the cooling compartment (11). Thus, the performance determinator (82) determines the airtightness of the cooling compartment (11) based on the time $\Delta t2$.

A fifth aspect of the invention is intended for the refrigerating apparatus of the second aspect of the invention, which further includes a defrosting end determinator (85) configured to terminate a defrosting operation of the evaporator (35) when an amount of frost on the evaporator (35) falls below a predetermined amount during the defrosting operation. The diagnosis process executer (81) is configured to alternately execute a cooling operation for cooling an inside of the cooling compartment (11) by the evaporator (35) and the defrosting operation such that the defrosting operation is performed after the cooling operation and the cooling operation is resumed when the defrosting end determinator (85) terminates the defrosting operation, and the performance determinator (82) is configured to determine the airtightness of the cooling compartment (11) by comparing between an execution time for a predetermined defrosting operation and an execution time for a defrosting operation previous to the predetermined defrosting operation.

In the fifth aspect of the invention, the cooling operation and the defrosting operation are alternately executed in the diagnosis process. That is, the defrosting operation is executed after the cooling operation. When the defrosting end determinator (85) terminates the defrosting operation, the cooling operation is resumed. Subsequently, the defrosting operation is resumed.

Suppose that sufficient airtightness of the cooling compartment (11) is ensured. When the cooling operation and the defrosting operation are alternately performed, the execution time for the defrosting operation is gradually shortened. This is because the evaporator (35) is defrosted by the defrosting operation and the humidity inside the cooling compartment (11) is gradually decreased due to discharge of melted water to outside the compartment as drain water. Thus, in this case, the amount of frost on the evaporator (35) is gradually decreased, and therefore timing for terminating the defrosting operation is advanced. As a result, an execution time for a current defrosting operation is shorter than an execution time for a previous defrosting operation.

On the other hand, if the airtightness of the cooling compartment (11) is insufficient, the in-compartment humidity is, even after the defrosting operation, re-increased due to the entering of external air. Thus, in such a case, the execution time for the current defrosting operation is not much shorter than the execution time for the previous defrosting operation, is equal to the execution time for the previous defrosting operation, or is longer than the execution time for the previous defrosting operation.

Thus, the performance determinator (82) determines the airtightness of the cooling compartment (11) by comparing the execution time between the current defrosting operation and the previous defrosting operation.

A sixth aspect of the invention is intended for the refrigerating apparatus of the second aspect of the invention, which further includes a defrosting start determinator (83) configured to start a defrosting operation of the evaporator (35) when an amount of frost on the evaporator (35) exceeds a predetermined amount. The diagnosis process executer (81) is configured to alternately execute a cooling operation for cooling an inside of the cooling compartment (11) by the evaporator (35) and the defrosting operation such that the defrosting start determinator (83) starts the defrosting operation after the cooling operation and then the cooling operation is resumed, and the performance determinator (82) is configured to determine the airtightness of the cooling compartment (11) by comparing between an execution time for a predetermined cooling operation and an execution time for a cooling operation previous to the predetermined cooling operation.

In the sixth aspect of the invention, the cooling operation and the defrosting operation are alternately executed. If the airtightness of the cooling compartment (11) is sufficient, the execution time for the cooling operation is gradually extended. This is because the evaporator (35) is defrosted by the defrosting operation and the humidity inside the cooling compartment (11) is gradually decreased due to discharge of melted water to outside the compartment as drain water. Thus, in this case, the amount of frost on the evaporator (35) is gradually decreased, and therefore timing for starting the defrosting operation is delayed. As a result, an execution time for a current cooling operation is longer than an execution time for a previous cooling operation.

On the other hand, if the airtightness of the cooling compartment (11) is insufficient, the in-compartment humidity is, even after the defrosting operation, re-increased due to the entering of external air. Thus, in such a case, the execution time for the current cooling operation is not much longer than the execution time for the previous cooling operation, is equal to the execution time for the previous cooling operation, or is shorter than the execution time for the previous cooling operation.

Thus, the performance determinator (82) determines the airtightness of the cooling compartment (11) by comparing the execution time between the current cooling operation and the previous cooling operation.

A seventh aspect of the invention is intended for the refrigerating apparatus of the first or second aspect of the invention, in which the refrigeration cycle unit (30) includes a temperature detector (70) configured to detect a temperature of air inside the cooling compartment (11), the diagnosis process executer (81) is configured to perform a cooling operation for cooling an inside of the cooling compartment (11) to a predetermined temperature by the evaporator (35), perform a rest operation for stopping the evaporator (35) after the cooling operation, and resume the cooling operation after a lapse of a predetermined set time since the rest operation is started, and the performance determinator (82) is configured to determine the performance of the cooling compartment (11) based on a change in temperature inside the cooling compartment (11) during the set time.

In the seventh aspect of the invention, the cooling operation, the rest operation, and the cooling operation are performed in this order. Specifically, in the initial cooling operation, the inside of the cooling compartment (11) is cooled to the predetermined temperature by the evaporator (35). Subsequently, the rest operation is executed, and the evaporator (35) is stopped. The cooling operation is, after the lapse of the set time since the rest operation is started, resumed to re-cool the inside of the cooling compartment (11).

If the airtightness or the thermal insulating performance of the cooling compartment (11) is lowered as compared to the potential performance of the cooling compartment (11), the in-compartment temperature is relatively sharply increased during the set time (i.e., the period for which the evaporator (35) is stopped) from the start of the rest operation to the resuming of the cooling operation. On the other hand, if the airtightness and the thermal insulating performance of the cooling compartment (11) are sufficient, the in-compartment temperature is moderately increased during the set time. Thus, the performance determinator (82) determines, based on the change in in-compartment temperature, the performance of the cooling compartment (11) during the period for stopping the evaporator (35).

An eighth aspect of the invention is intended for the refrigerating apparatus of the seventh aspect of the invention, in which the refrigeration cycle unit (30) includes a humidity detector (72) configured to detect a humidity of air inside the cooling compartment (11), and the performance determinator (82) is configured to determine the airtightness of the cooling compartment (11) based on a change in humidity during the set time.

In the eighth aspect of the invention, the humidity detector (72) is provided in the refrigeration cycle unit (30). In the diagnosis process, the in-compartment humidity is detected by the humidity detector (72) during the set time from the second operation in which the evaporator (35) is stopped to the third operation.

Suppose that a clearance is formed in the cooling compartment (11), and external air enters the compartment. Since moisture contained in the external air enters the compartment, the humidity detected by the humidity detector (72) is increased during the set time. On the other hand, if the airtightness of the cooling compartment (11) is sufficient, no moisture contained in the external air enters the compartment. Thus, the humidity detected by the humidity detector (72) is not changed during the set time. Consequently, the performance determinator (82) determines, based on the change in in-compartment humidity, the performance of the cooling compartment (11) during the period for stopping the evaporator (35).

A ninth aspect of the invention is intended for the refrigerating apparatus of any one of the third to eighth aspects of the invention, in which the refrigeration cycle unit (30) includes an in-compartment fan (36) configured to circulate air in the cooling compartment (11) such that the air in the cooling compartment (11) passes through the evaporator (35), and the diagnosis process executer (81) is configured to operate the in-compartment fan (36) in the cooling operation of the diagnosis process.

In the ninth aspect of the invention, the in-compartment fan (36) is operated in the cooling operation of the diagnosis process. This allows air inside the cooling compartment (11) to successively pass through the evaporator (35), thereby cooling the air. Thus, the inside of the cooling compartment (11) can be quickly cooled. When the air inside the cooling compartment (11) is cooled to equal to or lower than a dew-point temperature in the foregoing manner, moisture in the air is condensed, thereby dehumidifying the air. As a result, since the change in in-compartment humidity due to the entering of external air becomes notable, determination accuracy of the airtightness of the cooling compartment (11) by the performance determinator (82) is improved.

A tenth aspect of the invention is intended for the refrigerating apparatus of any one of the first to ninth aspects of the invention, in which the cooling compartment (11) is a trailer (11) mounted in a refrigerated vehicle (10).

In the tenth aspect of the invention, the cooling compartment (11) cooled by the refrigerating apparatus of any one of the first to ninth aspects of the invention is the trailer (11) mounted in the refrigerated vehicle (10). The trailer (11) is relatively large, and therefore it is difficult to ensure the airtightness at, e.g., the attachment part (opening (14)) of the trailer (11) to the casing body (21) or a door of the trailer (11). In manufacturing of the trailer (11), e.g., a wall surface of the trailer (11) may not be sufficiently thermally insulated.

However, in the refrigerating apparatus of the present invention, the airtightness and the thermal insulating performance of the trailer (11) can be determined by an automatic process (diagnosis process), and a suitable action can be taken to deal with the determination result.

Advantages of the Invention

According to the present invention, in the refrigerating apparatus attached to the opening (14) of the cooling compartment (11) at the casing body (21), the diagnosis process for determining the airtightness and the thermal insulating performance of the cooling compartment (11) is performed to determine the performance of the cooling compartment (11). Thus, e.g., entering of external air through a clearance formed between the casing body (21) and the opening (14) or failure in formation of an thermal insulator of the cooling compartment (11) can be automatically recognized, and a prompt action can be taken to deal with such defects. As a result, the degradation of the energy saving properties of the refrigerating apparatus due to the lowering of the performance of the cooling compartment (11) can be avoided in advance.

In particular, according to the second aspect of the invention, the airtightness (i.e., the entering of external air into the compartment) of the cooling compartment (11) which greatly influences a cooling performance of the refrigerating apparatus and frosting inside the compartment can be quickly determined.

According to the third aspect of the invention, the airtightness of the cooling compartment (11) can be determined by using the period from the predetermined point after the start of the cooling operation to the start of the defrosting operation. In addition, according to the fourth aspect of the invention, the airtightness of the cooling compartment (11) can be determined by using the period from the start of the defrosting operation to the termination of the defrosting operation. Moreover, according to the fifth aspect of the invention, the cooling operation and the defrosting operation are alternately performed, and the airtightness of the cooling compartment (11) can be easily determined by comparing the execution time between the current defrosting operation and the previous defrosting operation. According to the sixth aspect of the invention, the cooling operation and the defrosting operation are alternately performed, and the airtightness of the cooling compartment (11) can be easily determined by comparing the execution time between the current cooling operation and the previous cooling operation.

According to the seventh aspect of the invention, the rest operation for stopping the evaporator (35) is performed after the cooling operation, and the performance of the cooling compartment (11) can be determined by using the change in temperature inside the cooling compartment (11) during the rest operation. In particular, according to the eighth aspect of the invention, the entering of external air into the compartment, i.e., the airtightness of the cooling compartment (11), can be easily determined by using the change in humidity inside the cooling compartment (11) during the rest operation.

In the ninth aspect of the invention, the in-compartment fan (36) is, during the cooling operation of the diagnosis process, operated to actively circulate air inside the cooling compartment (11). Thus, the cooling compartment (11) can be quickly cooled, and the performance of the cooling compartment (11) can be quickly determined. In addition, since air inside the cooling compartment (11) is cooled to equal to or lower than the dew-point temperature, the humidity inside the cooling compartment (11) can be quickly decreased. That is, since moisture originally contained in air inside the cooling compartment (11) is quickly removed, a change in moisture due to the entering of external air can be easily recognized, and therefore the determination accuracy of the airtightness of the cooling compartment (11) can be improved.

In the tenth aspect of the invention, the performance of the trailer (11) having the airtightness and the thermal insulating performance which tend to change depending on processing accuracy and attachment accuracy can be determined. Thus, failure in the performance of the trailer (11) can be promptly improved, thereby ensuring the energy saving properties and reliability of the refrigerated vehicle (10).

BRIEF DESCRIPTION OF THE DRAWINGS

FIG. 7 is a graph illustrating a relationship between the temperature inside a cooling compartment and a lapse time in a diagnosis process of the first embodiment.

FIG. 8 is a graph illustrating a relationship between the temperature inside a cooling compartment and a lapse time in a diagnosis process of a first variation of the first embodiment.

DESCRIPTION OF EMBODIMENTS

Embodiments of the present invention will be described below in detail with reference to drawings. Note that the embodiments described below have been set forth merely for the purposes of preferred examples in nature, and are not intended to limit the scope, applications, and use of the invention.

First Embodiment of the Invention

Figure 1:
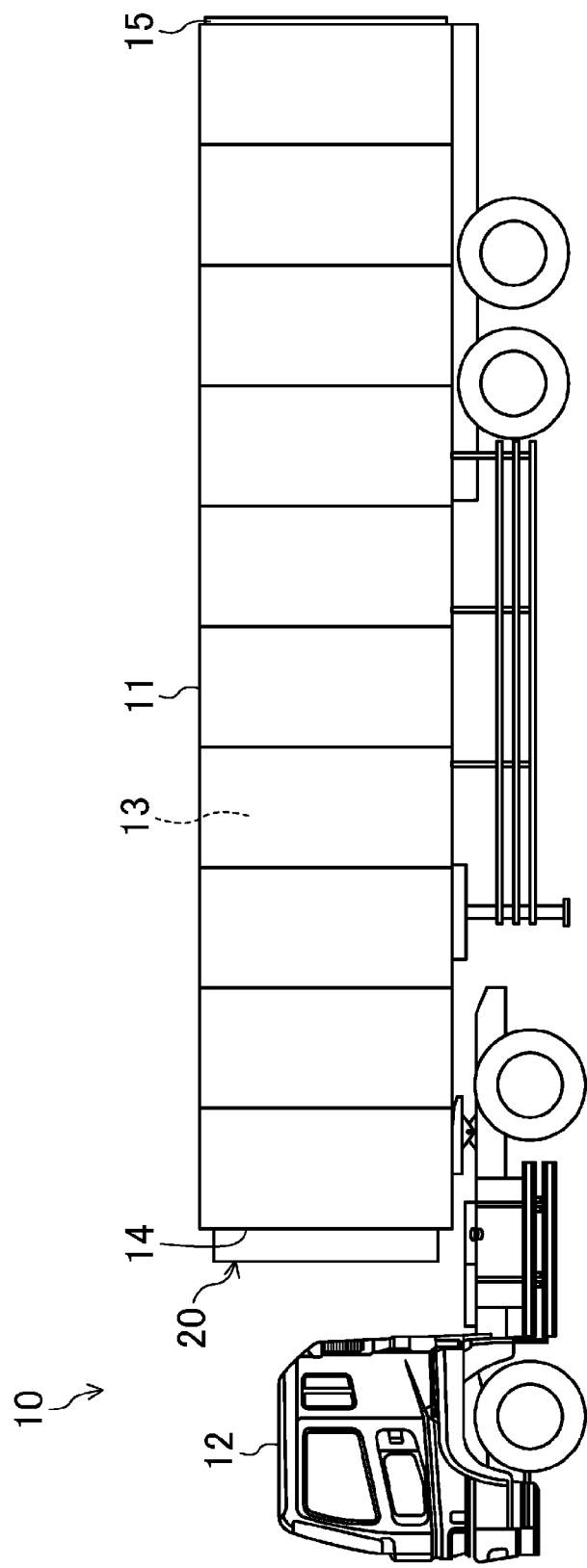
FIG. 1 is a side view of a refrigerated vehicle of an embodiment.

Referring to FIG. 1, a refrigerating apparatus (20) of the present invention is a trailer refrigerating apparatus to be mounted in a trailer (11) of a refrigerated vehicle (10). The refrigerated vehicle (10) is for transporting, e.g., fresh food and frozen food by road or rail. The refrigerated vehicle (10) includes the trailer (11) serving as a cooling compartment, and a tractor (12) configured to tow the trailer (11).

The trailer (11) is formed in an elongated rectangular parallelepiped box shape extending in a traveling direction (i.e., a longitudinal direction) of the refrigerated vehicle (10) and opening at a front end thereof. An in-compartment space (13) in which a target(s) to be cooled, such as frozen food, is stored is formed inside the trailer (11). An opening (14) is formed at the front end of the trailer (11), and the refrigerating apparatus (20) is provided at the opening (14). An openable door (15) is provided at a rear end of the trailer (11). A not-shown thermal insulator made of, e.g., foamed resin is embedded in each of wall surfaces of the trailer (11).

<Configuration of Refrigerating Apparatus>

Figure 2:
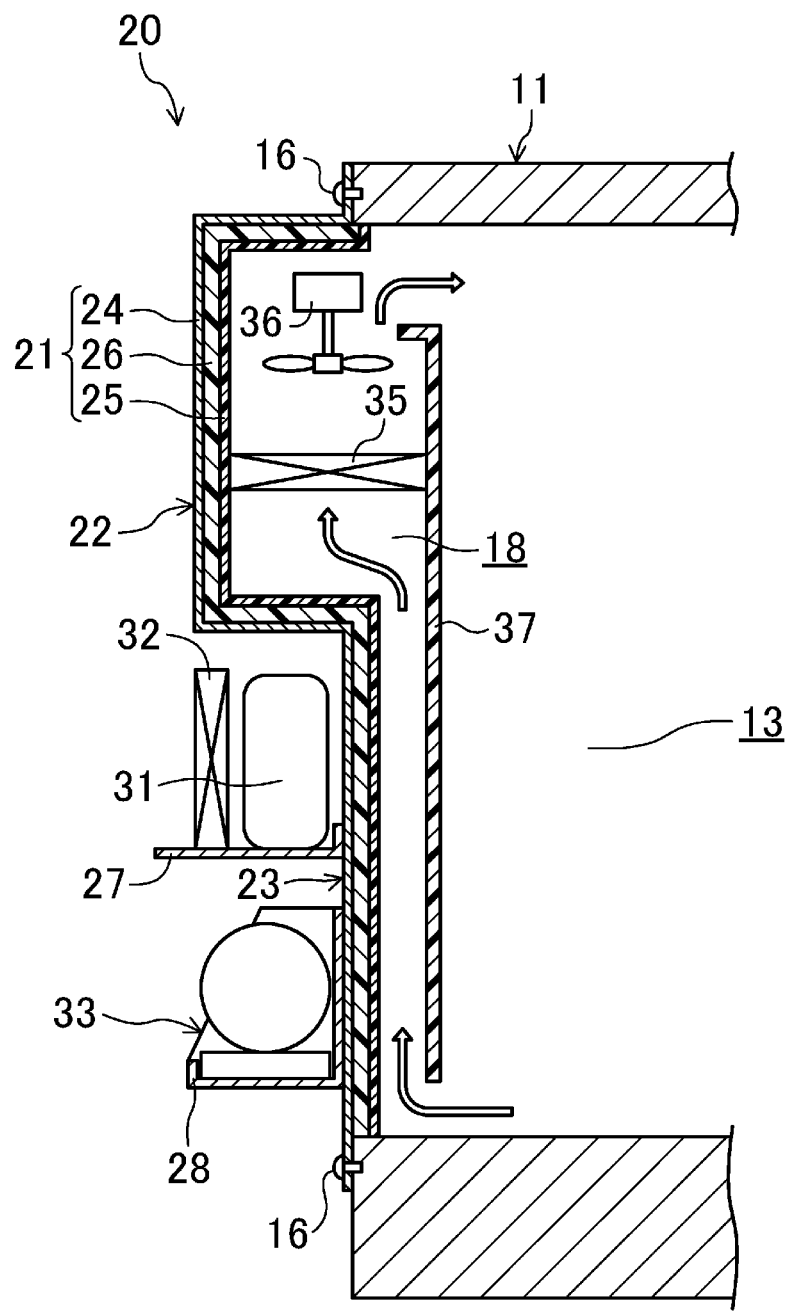
FIG. 2 is a longitudinal sectional view of a refrigerating apparatus of the embodiment.

Referring to FIG. 2, the refrigerating apparatus (20) includes a casing body (21) configured to close the opening (14), and a refrigeration cycle unit (30) formed by various components configured to cool the in-compartment space (13).

The casing body (21) is attached to an outer peripheral part of the opening (14) of the trailer (11) through fixing members (16) such as bolt nuts. Thus, the in-compartment space (13) of the trailer (11) is hermetically closed by the casing body (21). Note that a sealing material (not shown in the figure) configured to fill a clearance formed between the casing body (21) and the opening (14) of the trailer (11) is provided between the casing body (21) and the opening (14) of the trailer (11).

A protrusion (22) protruding toward the front is formed in an upper part of the casing body (21), and a flat plate part (23) which is substantially flush with the opening (14) of the trailer (11) is formed in a lower part of the casing body (21). The casing body (21) includes three members (24, 25, 26) stacked on each other in a thickness direction of the casing body (21) and having a substantially identical shape. Specifically, the casing body (21) includes the outside-compartment casing part (24) facing outside the compartment (outside a room), the in-compartment casing part (25) facing inside the compartment (in-compartment space (13)), and the thermal insulating casing part (26) interposed between the outside-compartment casing part (24) and the in-compartment casing part (25). The outside-compartment casing part (24) is made of, e.g., aluminum. The in-compartment casing part (25) is made of, e.g., fiber-reinforced plastic (FRP). The thermal insulating casing part (26) is made of, e.g., foamed resin having excellent thermal insulating properties. The thermal insulating casing part (26) is formed by filling a clearance between the outside-compartment casing part (24) and the in-compartment casing part (25) with foamed resin. Note that a front cover (not shown in the figure) is attached outside (in front of) the outside-compartment casing part (24) to cover a front part of the outside-compartment casing part (24).

On a front surface of the flat plate part (23) of the casing body (21) (i.e., outside the compartment), a first support plate (27) is provided closer to an upper part of the flat plate part (23), and a second support plate (28) is provided closer to a lower part of the flat plate part (23). A compressor (31) and a radiator (32) are placed on the first support plate (27), and an engine generator (33) is placed on the second support plate (28). An outside-compartment fan (34) (not shown in FIG. 2) is provided near the radiator (32).

In the in-compartment space (13), a divider (29) is provided near the casing body (21). The divider (29) vertically extends so as to be apart from a bottom part of the trailer (11) and a top part of the trailer (11) a predetermined distance. This forms a circulation path (18) between the in-compartment casing part (25) and the divider (29). In the circulation path (18), an evaporator (35) and an in-compartment fan (36) are provided. The in-compartment fan (36) is arranged above the evaporator (35), and is configured to upwardly deliver air from a lower part of the circulation path (18). That is, the in-compartment fan (36) is provided downstream of the evaporator (35).

<Configuration of Refrigerant Circuit of Refrigeration Cycle Unit>

The refrigeration cycle unit (30) includes a refrigerant circuit (40) configured to perform a vapor compression refrigeration cycle. The refrigerant circuit (40) includes a plurality of refrigerant pipes and various components connected to the refrigerant pipes. The refrigerant circuit (40) is filled with predetermined refrigerant.

Figure 3:
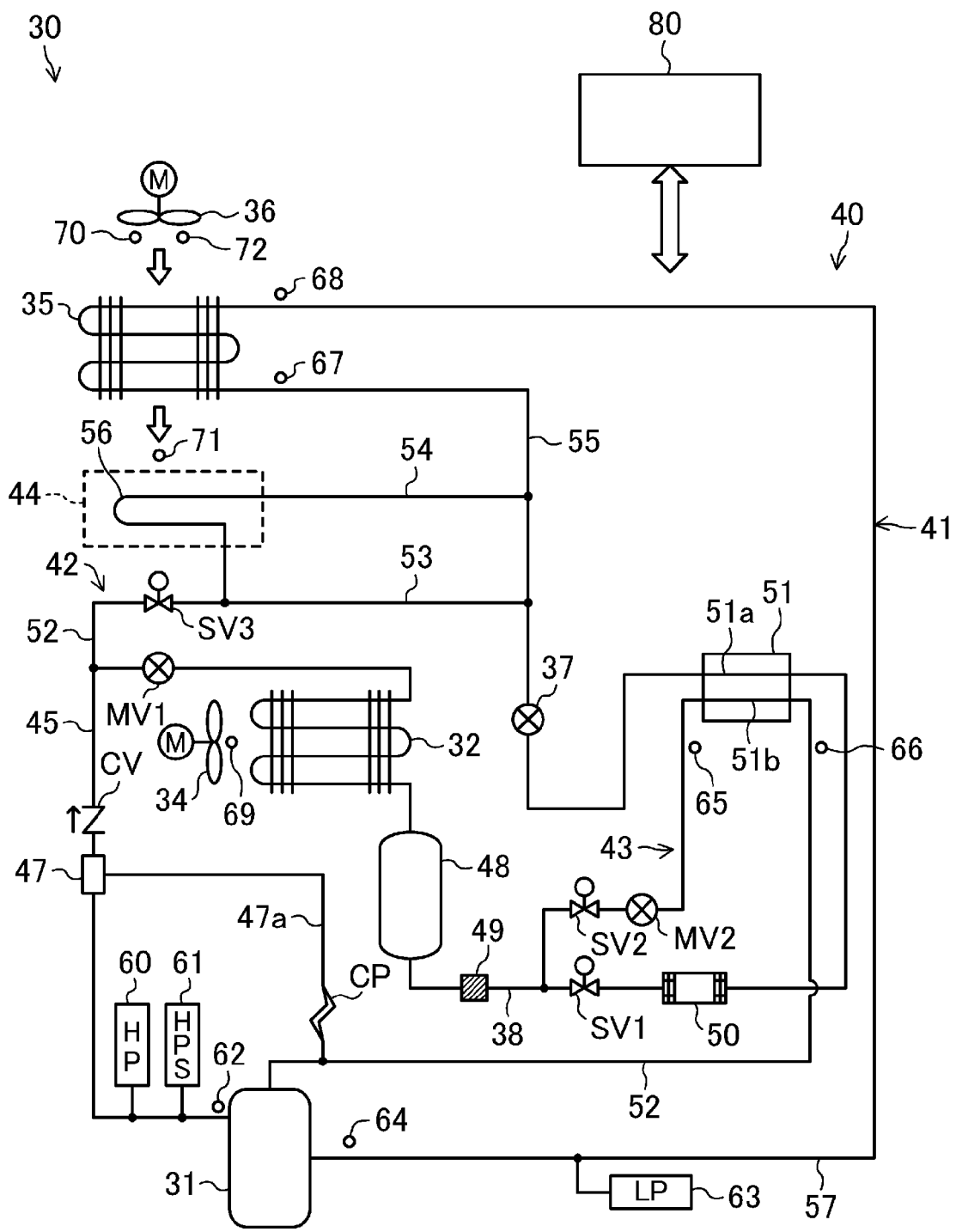
FIG. 3 is a piping diagram of a refrigeration cycle unit of the embodiment.

Referring to FIG. 3, the refrigerant circuit (40) includes a main circuit (41), a hot gas bypass circuit (42), and a subcooling circuit (43). The compressor (31), the radiator (condenser) (32), an expansion valve (37), and the evaporator (35) are, in this order, connected together in series in the main circuit (41).

The compressor (31) includes a motor (not shown in the figure) configured to drive a compression mechanism. The rotational speed of the motor of the compressor (31) is controlled at multiple levels by an inverter. That is, the compressor (31) is configured such that the operating capacity thereof is variable. The radiator (32) and the evaporator (35) are fin-and-tube heat exchangers. As described above, the radiator (32) is arranged outside the compartment. The outside-compartment fan (34) is provided near the radiator (32). In the radiator (32), heat is exchanged between outside-compartment air and refrigerant. As described above, the evaporator (35) is arranged inside the compartment. The in-compartment fan (36) is provided near the evaporator (35). In the evaporator (35), heat is exchanged between in-compartment air and refrigerant. A drain pan (44) is provided below the evaporator (35). The drain pan (44) is formed in a shallow container shape opening at an upper end thereof. For example, frost or ice blocks dropped from the evaporator (35), or dew condensation water formed by condensation of air are collected in the drain pan (44). The expansion valve (37) is configured such that the opening degree thereof is adjustable to multiple levels by a pulse motor.

In a high-pressure gas pipe (45) between the compressor (31) and the radiator (32), an oil separator (47), a check valve (CV), and a first motor-operated valve (MV1) are provided in this order. An oil return pipe (47a) of the oil separator (47) is connected to the subcooling circuit (43). In the oil return pipe (47a), a capillary tube (CP) is provided. The check valve (CV) allows a flow of refrigerant in a direction indicated by an arrow illustrated in FIG. 3, and prevents a flow of refrigerant in an opposite direction. The first motor-operated valve (MV1) is configured such that the opening degree thereof is adjustable to multiple levels by the pulse motor.

In a high-pressure liquid pipe (38) between the radiator (32) and the expansion valve (37), a receiver (48), a cooling member (49), a drier (50), a first on-off valve (SV1), and a plate heat exchanger (51) are provided in this order. A refrigerant flow path is formed inside the cooling member (49), and a power element of an inverter circuit contacts an outer part of the cooling member (49) (such a contact state is not shown in the figure). That is, the cooling member (49) is configured to cool the power element by refrigerant. The first on-off valve (SV1) is an openable solenoid valve. The drier (50) is configured to trap moisture contained in liquid refrigerant flowing from the radiator (32).

The plate heat exchanger (51) is configured to cool liquid refrigerant flowing from the radiator (32). The plate heat exchanger (51) includes a primary path (51a) and a secondary path (51b). That is, in the plate heat exchanger (51), heat is exchanged between refrigerant flowing through the primary path (51a) and refrigerant flowing through the secondary path (51b). The primary path (51a) is connected to the main circuit (41), and the secondary path (51b) is connected to an injection pipe (52) of the subcooling circuit (43). An inlet end of the injection pipe (52) is connected to part of the main circuit (41) between the cooling member (49) and the first on-off valve (SV1). An outlet end of the injection pipe (52) is connected to a compression chamber of the compressor (31) in the middle of compression (in an intermediate-pressure state). In part of the injection pipe (52) on an inlet side of the secondary path (51b), a second on-off valve (SV2) and a second motor-operated valve (MV2) are provided. The second on-off valve (SV2) is an openable solenoid valve. The second motor-operated valve (MV2) is configured such that the opening degree thereof is adjustable to multiple levels by the pulse motor, and serves as a pressure reduction mechanism configured to reduce the pressure of refrigerant.

The hot gas bypass circuit (42) includes a single main pipe (52) and two branched paths (53, 54) (i.e., the first branched pipe (53) and the second branched pipe (54)) branched from the main pipe (52). An inlet end of the main pipe (52) is connected to part of the high-pressure gas pipe (45) between the check valve (CV) and the first motor-operated valve (MV1). In the main pipe (52), a third on-off valve (SV3) is provided. The third on-off valve (SV3) is an openable solenoid valve.

The first branched pipe (53) is, at one end thereof, connected to the outlet end of the main pipe (52), and is, at the other end thereof, connected to a low-pressure liquid pipe (55) provided between the expansion valve (37) and the evaporator (35). Similarly, the second branched pipe (54) is, at one end thereof, connected to the outlet end of the main pipe (52), and is, at the other end thereof, connected to the low-pressure liquid pipe (55). The second branched pipe (54) is a refrigerant pipe longer than the first branched pipe (53). In addition, the second branched pipe (54) includes a drain pan heater (56) arranged so as to meander along a bottom part of the drain pan (44). The drain pan heater (56) is configured to heat an inside of the drain pan (44) by refrigerant. As described above, the hot gas bypass circuit (42) serves as a bypass circuit configured to supply refrigerant (i.e., high-temperature high-pressure gas refrigerant discharged from the compressor (31)) compressed in the compressor (31) to the evaporator (35).

Various sensors are also provided in the refrigerant circuit (40). Specifically, in the high-pressure gas pipe (45), a high-pressure sensor (60), a high-pressure switch (61), and a discharge temperature sensor (62) are provided. The high-pressure sensor (60) is configured to detect the pressure of high-pressure gas refrigerant discharged from the compressor (31). The discharge temperature sensor (62) is configured to detect the temperature of high-pressure gas refrigerant discharged from the compressor (31). In a low-pressure gas pipe (57) provided between the evaporator (35) and the compressor (31), a low-pressure sensor (63) and a suction temperature sensor (64) are provided. The low-pressure sensor (63) is configured to detect the pressure of low-pressure gas refrigerant sucked into the compressor (31). The suction temperature sensor (64) is configured to detect the temperature of low-pressure gas refrigerant sucked into the compressor (31).

In the injection pipe (52), a first inlet temperature sensor (65) is provided on the inlet side of the secondary path (51b), and a first outlet temperature sensor (66) is provided on an outlet side of the secondary path (51b). The first inlet temperature sensor (65) is configured to detect the temperature of refrigerant right before the refrigerant flows into the secondary path (51b). The first outlet temperature sensor (66) is configured to detect the temperature of refrigerant right after the refrigerant flows out from the secondary path (51b).

In the low-pressure liquid pipe (55), a second inlet temperature sensor (67) is provided on an inlet side of the evaporator (35). The second inlet temperature sensor (67) is configured to detect the temperature of refrigerant right before the refrigerant flows into the evaporator (35). In the low-pressure gas pipe (57), a second outlet temperature sensor (68) is provided on an outlet side of the evaporator (35). The second outlet temperature sensor (68) is configured to detect the temperature of refrigerant right after the refrigerant flows out from the evaporator (35).

An external air temperature sensor (69) is provided on an inlet side of the radiator (32) outside the trailer (11). The external air temperature sensor (69) is configured to detect the temperature of outside-compartment air (i.e., the temperature of external air) right after the outside-compartment air passes through the radiator (32). In the trailer (11), a suction temperature sensor (70) is provided on the inlet side of the evaporator (35), and a discharge temperature sensor (71) is provided on the outlet side of the evaporator (35). The suction temperature sensor (70) is configured to detect the temperature of in-compartment air right before the in-compartment air passes through the evaporator (35). The discharge temperature sensor (71) is configured to detect the temperature of in-compartment air right after the in-compartment air passes through the evaporator (35). That is, the suction temperature sensor (70) serves as a temperature detector configured to detect the temperature of in-compartment air.

Moreover, an in-compartment humidity sensor (72) is provided in the trailer (11). The in-compartment humidity sensor (72) is configured to detect the humidity of air on the inlet side (upstream side) of the evaporator (35). That is, the in-compartment humidity sensor (72) serves as a humidity detector configured to detect the humidity of in-compartment air returning from the in-compartment space (13) to the circulation path (18).

In the refrigerating apparatus (20), a controller (80) is provided as a control section configured to control the refrigeration cycle unit (30). That is, the controller (80) is configured to control, based on detection signals of the foregoing various sensors, the rotational speed of the motor of the compressor (31), the rotational speed of a motor of each of the fans (34, 36), the opening degree of each of the motor-operated valves (MV1, MV2) and the expansion valve (37), an opening/closing state of each of the on-off valves (SV1, SV2, SV3), etc.

Figure 4:
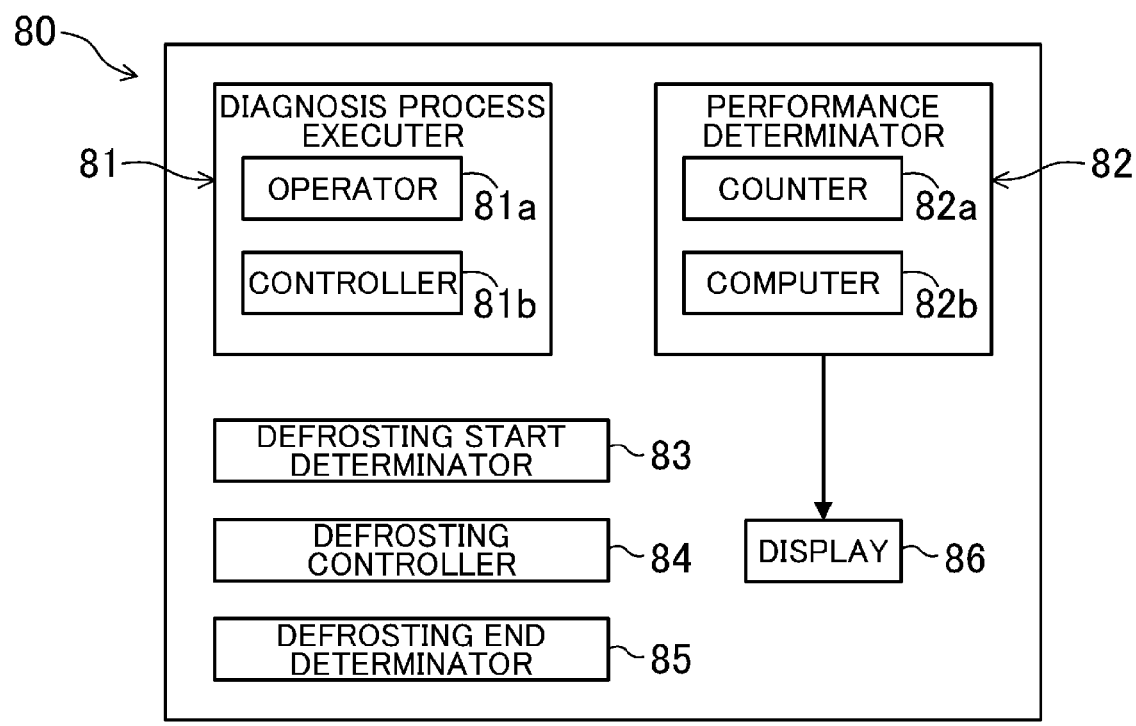
FIG. 4 is a schematic block diagram of a controller of the first embodiment.

Referring to FIG. 4, the controller (80) of the present embodiment includes a diagnosis process executer (81) configured to control the refrigeration cycle unit (30) to execute a diagnosis process for diagnosing airtightness of the trailer (11), and a performance determinator (82) configured to determine a performance of the trailer (11) in the diagnosis process. The diagnosis process executer (81) includes an operator (81a) configured to start the diagnosis process by, e.g., a user, and a controller (81b) configured to control the refrigeration cycle unit (30) during the diagnosis process. The performance determinator (82) includes a counter (82a) and a computer (82b).

The controller (80) further includes a defrosting start determinator (83), a defrosting controller (84), and a defrosting end determinator (85). The defrosting start determinator (83) is configured to start, when the amount of frost on the evaporator (35) exceeds a predetermined amount, a defrosting operation for defrosting the evaporator (35). The defrosting controller (84) is configured to control the refrigeration cycle unit (30) in the defrosting operation. The defrosting end determinator (85) is configured to terminate the defrosting operation when the amount of frost on the evaporator (35) falls below the predetermined amount during the defrosting operation.

In the present embodiment, the second inlet temperature sensor (67) and the second outlet temperature sensor (68) described above are used as frost detectors configured to detect the amount of frost on the evaporator (35). That is, if the amount of frost on the evaporator (35) is large, heat transfer between refrigerant inside the evaporator (35) and air inside the trailer (11) is blocked. As a result, a difference (EOS−EIS) between a temperature EIS of refrigerant flowing into the evaporator (35) and a temperature EOS of refrigerant flowing out from the evaporator (35) is decreased. Conversely, if the amount of frost on the evaporator (35) is small, the heat transfer between refrigerant and in-compartment air is accelerated. Thus, the temperature difference (EOS−EIS) is increased. For the foregoing reasons, the temperature difference (EOS−EIS) of refrigerant on the inlet and outlet sides of the evaporator (35) is used as an indicator for the amount of frost on the evaporator (35) in the present embodiment.

More specifically, the defrosting start determinator (83) includes an input section to which the refrigerant temperature (EIS) detected by the second inlet temperature sensor (67) and the refrigerant temperature (EOS) detected by the second outlet temperature sensor (68) are input, and a computing section configured to calculate the temperature difference (EOS−EIS) based on the input values to compare the calculated temperature difference (EOS−EIS) with a reference value X1 (the foregoing sections are not shown in the figure). If the temperature difference (EOS−EIS) is less than the reference value X1, it can be determined that the heat transfer is blocked due to the large amount of frost on the evaporator (35). In such a case, the defrosting start determinator (83) starts the defrosting operation when the temperature difference (EOS−EIS) becomes less than the reference value X1. Note that the reference value X1 is a temperature difference of refrigerant on the inlet and outlet sides of the evaporator (35) when the amount of frost on the evaporator (35) exceeds a predetermined upper limit. In addition, the reference value X1 is experimentally obtained in advance, and is set in the defrosting start determinator (83).

Similarly, the defrosting end determinator (85) includes an input section to which the refrigerant temperature (EIS) detected by the second inlet temperature sensor (67) and the refrigerant temperature (EOS) detected by the second outlet temperature sensor (68) are input, and a computing section configured to calculate the temperature difference (EOS−EIS) based on the input values to compare the calculated temperature difference (EOS−EIS) with a reference value X2 (the foregoing sections are not shown in the figure). If the temperature difference (EOS−EIS) is greater than the reference value X2, it can be determined that the heat transfer is accelerated due to defrosting of the evaporator (35). In such a case, the defrosting end determinator (85) terminates the defrosting operation when the temperature difference (EOS−EIS) becomes greater than the reference value X2. Note that the reference value X2 is a temperature difference of refrigerant on the inlet and outlet sides of the evaporator (35) when the amount of frost on the evaporator (35) falls below a predetermined allowable value. In addition, the reference value X2 is experimentally obtained in advance, and is set in the defrosting end determinator (85).

Processes and Operations

Next, processes and operations of the refrigerating apparatus (20) will be described. The refrigerating apparatus (20) is configured to perform a "cooling operation" as a normal process. In addition, the refrigerating apparatus (20) is configured to perform the diagnosis process for determining the performance (airtightness and a thermal insulating performance) of the trailer (11) (details will be described later). Moreover, the refrigerating apparatus (20) is configured to perform, as necessary, the defrosting operation for melting frost adhered to the evaporator (35) in the cooling operation or the diagnosis process.

<Cooling Operation>

Figure 5:
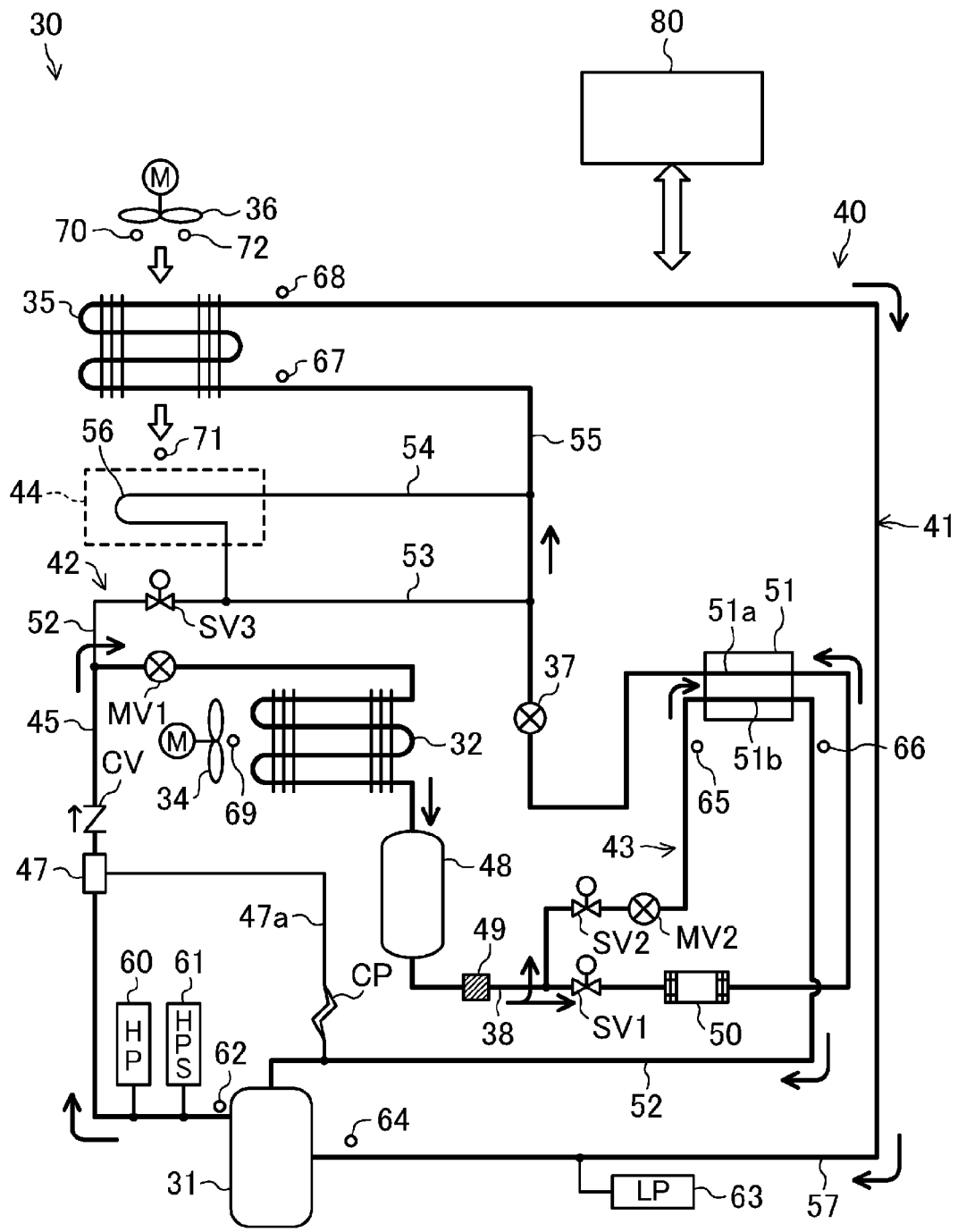
FIG. 5 is a piping diagram of the refrigeration cycle unit of the embodiment, and illustrates a flow of refrigerant in a cooling operation.

A basic sequence of the cooling operation will be described with reference to FIGS. 2 and 5.

In the cooling operation, the first on-off valve (SV1) is in an open state, and the third on-off valve (SV3) is in a closed state. The first motor-operated valve (MV1) is a fully-open state, and the opening degrees of the second motor-operated valve (MV2) and the expansion valve (37) are adjusted as necessary. In addition, the compressor (31), the outside-compartment fan (34), and the in-compartment fan (36) are in operation.

Refrigerant compressed in the compressor (31) is condensed (dissipates heat) in the radiator (32), and then passes through the receiver (48). After the passage through the receiver (48), part of the refrigerant flows through the low-pressure liquid pipe (55), and the remaining refrigerant flows into the injection pipe (52). The pressure of the refrigerant flowing through the low-pressure liquid pipe (55) is reduced by the expansion valve (37), and then such refrigerant flows into the evaporator (35). In the evaporator (35), the refrigerant is evaporated by absorbing heat from in-compartment air. In such a manner, air of the in-compartment space (13) is cooled by the refrigerant. The refrigerant evaporated in the evaporator (35) is sucked into the compressor (31).

The pressure of the refrigerant flowing into the injection pipe (52) is reduced to an intermediate pressure by passing through the second motor-operated valve (MV2), and then such refrigerant flows into the secondary path (51b) of the plate heat exchanger (51). In the plate heat exchanger (51), heat is exchanged between the refrigerant flowing through the primary path (51a) and the refrigerant flowing through the secondary path (51b). As a result, the refrigerant of the primary path (51a) is subcooled, and the refrigerant of the secondary path (51b) is evaporated. The refrigerant flowing out from the secondary path (51b) is sucked into the compression chamber in the intermediate-pressure state through an intermediate port of the compressor (31).

In the cooling operation, the rotational speed of the motor of the compressor (31) (i.e., the operating frequency of the compressor (31)) is controlled. Specifically, the operating frequency of the compressor (31) is controlled such that an in-compartment temperature SS approaches a target temperature SP. More specifically, the operating frequency of the compressor (31) in the cooling operation is adjusted by a PID control such that the in-compartment temperature SS converges to the target temperature SP. In addition, in the cooling operation, the rotational speed of the motor of the outside-compartment fan (34) is also controlled. Specifically, the rotational speed of the motor of the outside-compartment fan (34) is controlled such that a pressure HP of high-pressure refrigerant detected by the high-pressure sensor (60) is maintained constant. The rotational speed of the motor of the in-compartment fan (36) is controlled at multiple levels depending on a cooling load inside the compartment.

In the cooling operation, the opening degree of the expansion valve (37) is adjusted by a so-called "superheating degree control." Specifically, the opening degree of the expansion valve (37) is controlled such that the superheating degree of low-pressure refrigerant sucked into the compressor (31) approaches a predetermined set superheating degree. In addition, in the cooling operation, the opening degree of the second motor-operated valve (MV2) is also adjusted by the superheating degree control. Specifically, the opening degree of the expansion valve (37) is controlled such that the superheating degree of intermediate-pressure refrigerant flowing out from the secondary path (51b) of the plate heat exchanger (51) approaches a predetermined set superheating degree.

<Defrosting Operation>

While the foregoing cooling operation is continuously performed, frost is adhered to, e.g., a surface of a heat transfer pipe of the evaporator (35), and gradually grows into larger one. Thus, in the refrigerating apparatus (20), the defrosting operation for defrosting the evaporator (35) is executed as necessary.

In the present embodiment, the defrosting start determinator (83) determines whether or not the refrigerating apparatus (20) starts the defrosting operation. Specifically, the defrosting start determinator (83) calculates, as necessary, the difference (EOS−EIS) between the temperature EIS of refrigerant flowing into the evaporator (35) and the temperature EOS of refrigerant flowing out from the evaporator (35). If the calculated temperature difference (EOS−EIS) is equal to or greater than the reference value X1, it is regarded that heat is sufficiently exchanged between refrigerant and air in the evaporator (35). Thus, in this case, the cooling operation is continued.

On the other hand, if the calculated temperature difference (EOS−EIS) is less than the reference value X1, it is regarded that heat is, due to a large amount of frost, not sufficiently exchanged between refrigerant and air in the evaporator (35). Thus, in this case, the defrosting operation is executed.

Figure 6:
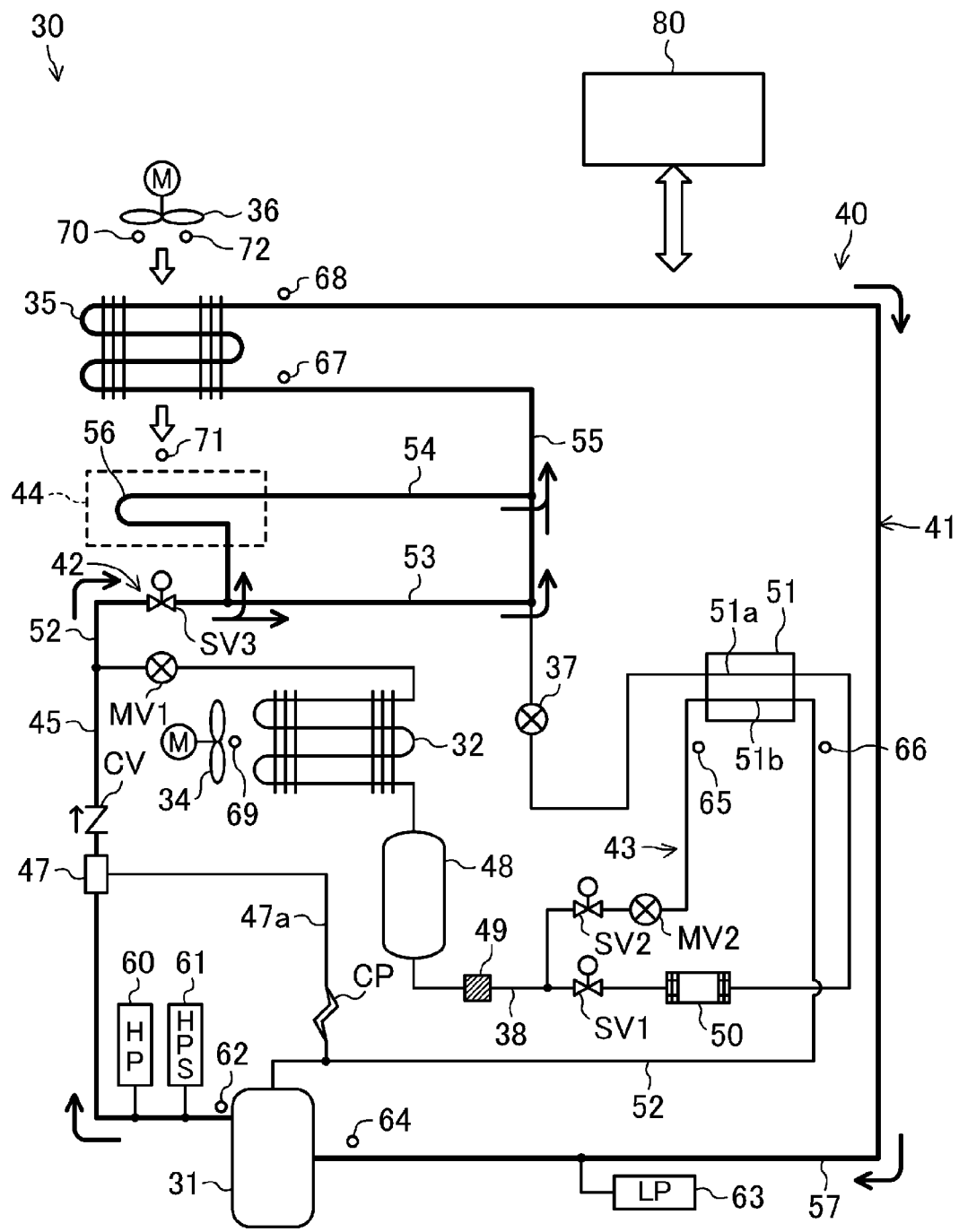
FIG. 6 is a piping diagram of the refrigeration cycle unit of the embodiment, and illustrates a flow of refrigerant in a defrosting operation.

The defrosting operation of the present embodiment is a so-called "hot gas defrosting operation." Specifically, referring to FIG. 6, the first on-off valve (SV1) and the second on-off valve (SV2) are in the closed state, and the third on-off valve (SV3) is in the open state. In addition, the first motor-operated valve (MV1) is, in principle, at the minimum opening degree, and the second motor-operated valve (MV2) and the expansion valve (37) are in a fully-closed state (zero pulse). Moreover, while the compressor (31) is in operation, the outside-compartment fan (34) and the in-compartment fan (36) are stopped.

Refrigerant compressed in the compressor (31) is supplied to the evaporator (35) by way of the hot gas bypass circuit (42). Specifically, after passage through the main pipe (52), a flow of high-pressure gas refrigerant branches into the first branched pipe (53) and the second branched pipe (54). The refrigerant flowing into the second branched pipe (54) passes through the drain pan heater (56). In such a state, e.g., ice blocks dropped from the surface of the evaporator (35) are collected in the drain pan (44). The ice blocks etc. are heated and melted by the refrigerant flowing through the drain pan heater (56). The melted water is discharged to outside the compartment through a predetermined flow path.

The refrigerant flowing out from the drain pan heater (56) joins the refrigerant flowing out from the first branched pipe (53), and then flows into the evaporator (35). The high-pressure gas refrigerant (so-called "hot gas") circulates through the heat transfer pipe of the evaporator (35). Thus, in the evaporator (35), frost adhered to the periphery of the heat transfer pipe is gradually heated from the inside of the heat transfer pipe by the refrigerant. As a result, the frost adhered to the evaporator (35) is gradually melted, and then is dropped from the heat transfer pipe. The frost (ice blocks) dropped from the heat transfer pipe is collected in the drain pan (44). The refrigerant used for defrosting the evaporator (35) is sucked into the compressor (31), and then is compressed.

After frost (ice blocks etc.) dropped from the evaporator (35) in the defrosting operation is collected in the drain pan (44), the frost is heated into liquid by the drain pan heater (56). The liquid (so-called "drain water") is discharged from the drain pan (44) to outside the trailer (11) through the predetermined discharge path.

<Diagnosis Process>

As described above, the refrigerating apparatus (20) is configured to perform the diagnosis process for diagnosing the airtightness of the trailer (11) serving as the cooling compartment. The diagnosis process is executed after the casing body (21) is attached to the opening (14) of the trailer (11). Note that the diagnosis process is, in the present embodiment, executed in such a manner that, e.g., a user handles the operator (81a). However, e.g., after the refrigerating apparatus (20) is attached to the trailer (11), the diagnosis process may be automatically executed as an initial process.

When the diagnosis process is executed, a cooling operation for cooling the inside of the trailer (11) is first executed. In the cooling operation, the compressor (31) is, as in the foregoing cooling operation, operated to perform the refrigeration cycle in the refrigerant circuit (40), and the trailer (11) (i.e., the inside of the compartment) is cooled by the evaporator (35). In addition, in the cooling operation, the outside-compartment fan (34) and the in-compartment fan (36) are in operation as in the foregoing cooling operation.

Referring to FIG. 7, in the diagnosis process, the cooling operation is first executed, and therefore in-compartment air of the trailer (11) is cooled such that the temperature inside the trailer (11) approaches a predetermined target temperature (e.g., −5° C.). The cooling operation continues for a predetermined time set in the diagnosis process executer (81). Note that the set time is a time for which air dehumidification is performed by cooling air inside the trailer (11) to equal to or lower than a dew-point temperature and condensing moisture contained in the air.

That is, in the diagnosis process, when the cooling operation is first executed, air (having a temperature of, e.g., 30° C.) inside the trailer (11) is gradually cooled to equal to or lower than the dew-point temperature (e.g., 10° C.). In such a manner, moisture contained in the air is condensed, thereby dehumidifying the air. Subsequently, after a lapse of the predetermined set time since the cooling operation is started, the counter (82a) is actuated. That is, in the diagnosis process, after a lapse of the predetermined time since the cooling operation is executed, the counter (82a) is actuated at a point t1.

Subsequently, as the cooling operation further continues, the temperature of in-compartment air of the trailer (11) is further decreased. Suppose that a clearance is, in the diagnosis process, formed between the opening (14) of the trailer (11) and the casing body (21) due to insufficient attachment of the casing body (21) to the opening (14) of the trailer (11). If the airtightness of the trailer (11) is lowered for the foregoing reason, heat of air (outside-compartment air) outside the trailer (11) enters the in-compartment space (13) of the trailer (11). As a result, a disadvantage that the in-compartment space (13) cannot be efficiently cooled although a desired performance of the refrigeration cycle unit (30) is realized is caused. For such a reason, in the diagnosis process, the airtightness of the trailer (11) is automatically determined.

Specifically, suppose that external air enters the in-compartment space (13) of the trailer (11) after the cooling operation is executed and the counter (82a) is actuated at the point t1. In such a case, moisture contained in external air gradually enters the in-compartment space (13). Thus, moisture contained in air flowing through the circulation path (18) and passing through the evaporator (35) is adhered to the surface of the evaporator (35), and is formed into frost. That is, if the airtightness of the trailer (11) is insufficient, the amount of frost on the evaporator (35) is gradually increased. In the diagnosis process, the amount of frost on the evaporator (35) is detected by the foregoing frost detectors (i.e., the second inlet temperature sensor (67) and the second outlet temperature sensor (68)).

More specifically, if the defrosting start determinator (83) determines, after the point t1, that the temperature difference (EOS−EIS) of refrigerant on the inlet and outlet sides of the evaporator (35) is less than the reference value X1, the defrosting operation is executed as described above. The counter (82a) measures a time Δt1 from the point t1 to a point t2 at which the defrosting operation is started. At this point, if the time Δt1 is shorter than a predetermined reference time Δts1, it can be determined that the amount of frost on the evaporator (35) is increased because moisture enters the compartment due to entering of external air. Thus, when the computer (82b) of the performance determinator (82) determines that the time Δt1 is shorter than the reference time Δts1, it is determined that external air enters the compartment, and an alert informing "entering of external air (insufficient airtightness)" is displayed on a display (86). A user etc. can view the alert on the display (86), thereby recognizing that a clearance is formed in the trailer (11). Thus, the user etc. can take prompt action to fill the clearance of the trailer (11). Note that the reference time Δts1 is a value experimentally obtained in advance and is set in the controller (80).

On the other hand, if the time Δt1 is longer than the reference time Δts1, it can be regarded that not so much moisture enters the compartment and the amount of frost on the evaporator (35) is small. Thus, when the computer (82b) of the performance determinator (82) determines that the time Δt1 is equal to or longer than the reference time Δts1, it is regarded that no external air enters the compartment, and an alert informing "no entering of external air (sufficient airtightness)" is displayed on the display (86).

Advantages of First Embodiment

According to the first embodiment, in the refrigerating apparatus (20) attached to the opening (14) of the trailer (11) at the casing body (21), the diagnosis process for determining the airtightness of the trailer (11) can be executed. This allows a user etc. to promptly recognize that a clearance is formed at the opening (14) or the door (15) of the trailer (11). Thus, the airtightness of the trailer (11) can be promptly improved upon attachment of the refrigerating apparatus (20), and energy saving properties of the entire apparatus can be improved.

In the foregoing embodiment, the entering of external air is determined by using timing (Δt1) for starting the defrosting operation which is also executed in the normal cooling operation. Thus, it can be determined, without adding a special device, whether or not external air enters the trailer (11).

In the foregoing embodiment, the in-compartment fan (36) is operated during the cooling operation of the diagnosis process to circulate air in the in-compartment space (13). Thus, the trailer (11) can be quickly cooled, resulting in shortening of the diagnosis process. In addition, the target temperature in the cooling operation is set at equal to or lower than the dew-point temperature (e.g., −5° C.) of moisture contained in air. Thus, in the cooling operation, moisture contained in in-compartment air can be condensed, thereby dehumidifying such air. Consequently, for a period between the point t1 and the point t2 after the cooling operation, entering of moisture into the compartment due to the entering of external air can be more accurately determined.

Variations of First Embodiment

In the first embodiment, variations each having a configuration described below can be employed.

First Variation of First Embodiment

In the first embodiment, the entering of external air into the trailer (11) is determined by using the time Δt1 between the point t1 at which the predetermined time is elapsed since the cooling operation is started and the point t2 at which the defrosting operation is started. However, the entering of external air into the trailer (11) may be determined based on a time at which the defrosting operation is executed.

Specifically, the performance determinator (82) of the first variation of the first embodiment determines, referring to FIG. 8, the airtightness of the trailer (11) based on a time Δt2 between the point t2 at which the defrosting operation is started and a point t3 at which the defrosting operation is terminated. More specifically, when the diagnosis process is executed, the cooling operation is first performed as in the first embodiment. During the cooling operation, when the temperature difference (EOS−EIS) in the evaporator (35) becomes less than the reference value X1, the defrosting start determinator (83) starts the defrosting operation. The counter (82a) detects the point t2 at which the defrosting operation is started.

Then, when the defrosting operation is performed, frost on the evaporator (35) is melted. During the defrosting operation, when the temperature difference (EOS−EIS) in the evaporator (35) becomes greater than the reference value X2, the defrosting end determinator (85) terminates the defrosting operation. The counter (82a) measures the time Δt2 between the point t2 and the point t3 at which the defrosting operation is terminated. If the time Δt2 is longer than a predetermined reference time Δts2, it can be determined that the amount of frost on the evaporator (35) is increased due to entering of external air and a time for removing the frost is extended. Thus, when the time Δt2 is longer than the reference time Δts2, the performance determinator (82) determines that external air enters the compartment, and displays an alert informing "entering of external air (insufficient airtightness)" on the display (86). A user etc. can view the alert on the display (86), thereby recognizing that a clearance is formed in the trailer (11). Thus, the user etc. can take prompt action to fill the clearance of the trailer (11). Note that the reference time Δts2 is a value experimentally obtained in advance and is set in the controller (80).

On the other hand, if the time Δt2 is shorter than the reference time Δts2, it can be determined that not so much moisture enters the compartment and the amount of frost on the evaporator (35) is small. Thus, when the time Δt1 is equal to or longer than the reference time Δts1, the performance determinator (82) determines that no external air enters the compartment, and an alert informing "no entering of external air (sufficient airtightness)" is displayed on the display (86).

Second Variation of First Embodiment

In each of the foregoing embodiments, the reference times Δts1, Δts2 for determining the airtightness of the trailer (11) are predetermined fixed values. However, the reference times Δts1, Δts2 may be corrected depending on outside-compartment air conditions.

That is, if external air enters the trailer (11), the time Δt1 (i.e., the period from the end of the cooling operation to the start of the defrosting operation) and the time Δt2 (i.e., the period for the defrosting operation) measured in the foregoing embodiments vary depending on the humidity of external air. Thus, when the humidity of external air is extremely high or low, if the airtightness of the trailer (11) is determined based on the reference time Δts1, Δts2 which is the fixed value, the determination result may be incorrect. For such a reason, an external air humidity detector configured to detect the humidity outside the compartment may be provided to correct the reference time Δts1, Δts2 depending on the detected external humidity. Specifically, e.g., if the external air humidity is relatively high, it is likely that the amount of frost on the evaporator (35) is increased due to entering of external air. In such a case, the reference time Δts1 is corrected to a longer time, or the reference time Δts2 is corrected to a shorter time. Conversely, if the external air humidity is relatively low, the reference time Δts1 is corrected to a shorter time, or the reference time Δts2 is corrected to a longer time. In such a manner, the airtightness of the trailer (11) can be determined considering the humidity of external air, resulting in improvement of accuracy of the determination result. Note that the external air humidity detector may be a humidity sensor arranged outside the compartment, or may be, e.g., the in-compartment humidity sensor (72) configured to detect the humidity of in-compartment air before the in-compartment space (13) is cooled. That is, in the trailer (11), the humidity of in-compartment air before the in-compartment space (13) is cooled is substantially equal to the humidity of outside-compartment air. Thus, in such a manner that the humidity of in-compartment air is detected by the in-compartment humidity sensor (72) right before the diagnosis process is started, the humidity of outside-compartment air can be substantially detected.

Third Variation of First Embodiment

The first embodiment and the first variation of the first embodiment may be combined together. That is, in the performance determinator (82), the time Δt1 and the reference time Δts1 may be compared to each other, and the time Δt2 and the reference time Δts2 may be also compared to each other. Such a combination further improves the determination accuracy of the airtightness of the trailer (11).

Second Embodiment of the Invention

Figure 9:
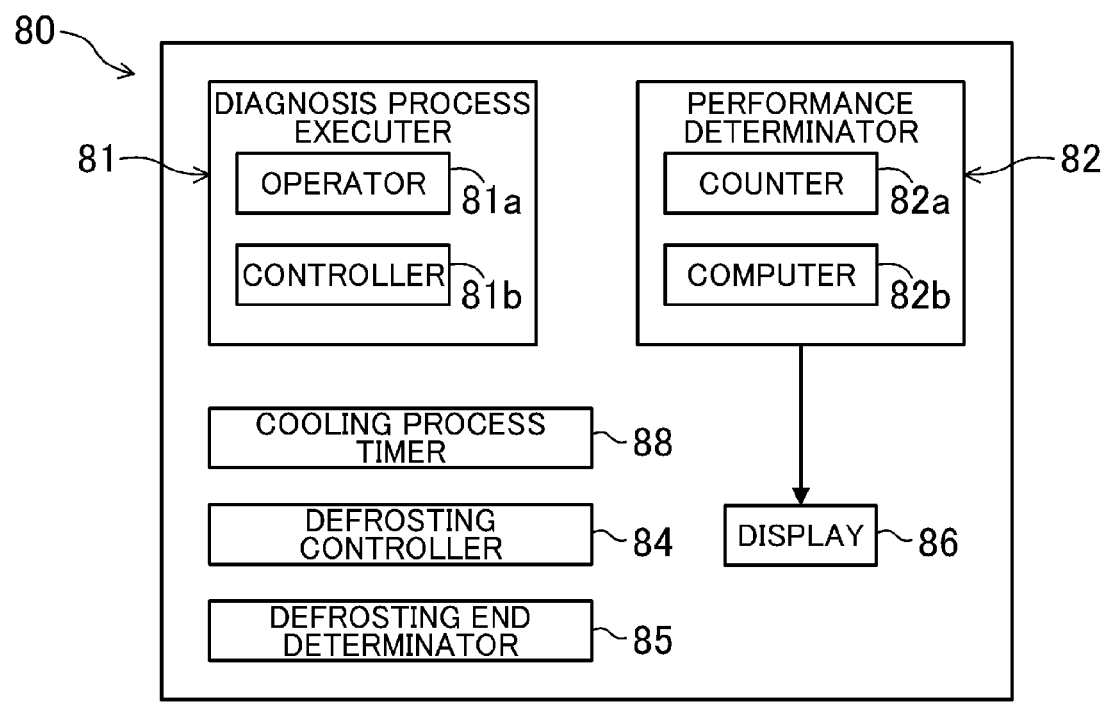
FIG. 9 is a schematic block diagram of a controller of a second embodiment.
Figure 10:
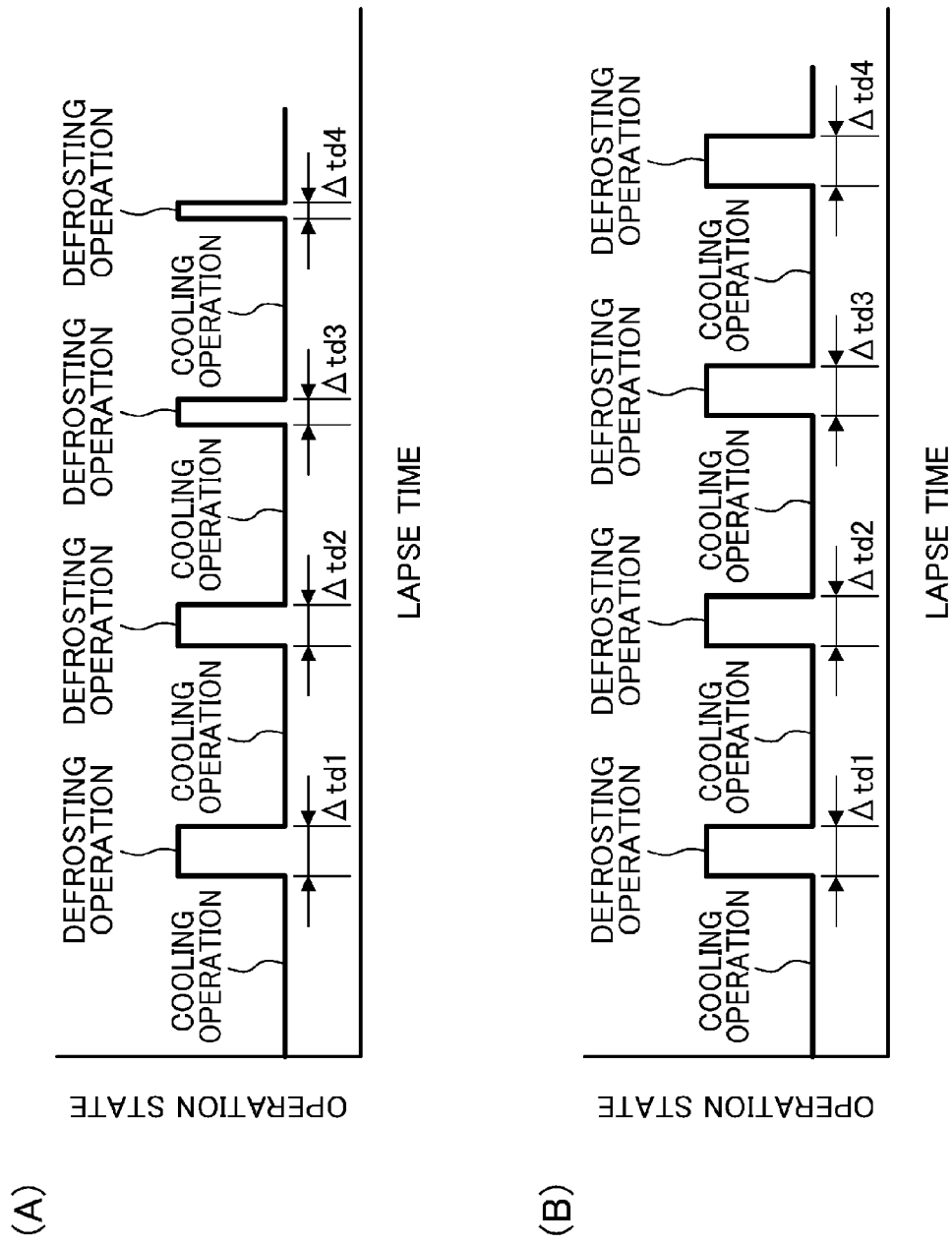
FIG. 10 is a time chart illustrating a relationship between an operation state and a lapse time in a diagnosis process of the second embodiment.

A refrigerating apparatus (20) of a second embodiment of the present invention is different from that of the first embodiment in a method for a diagnosis process of a trailer (11). Specifically, in a controller (80) of the second embodiment, a cooling operation timer (88) is, referring to FIG. 9, provided instead of the defrosting start determinator (83) of the first embodiment. A diagnosis process executer (81) of the second embodiment controls a refrigeration cycle unit (30) such that a diagnosis process similar to the normal cooling process described above. That is, in the diagnosis process, an evaporator (35) performs a cooling operation for cooling an in-compartment space (13), and performs a defrosting operation after the cooling operation. After the defrosting operation, the cooling operation is resumed. That is, in the diagnosis process, the cooling operation and the defrosting operation are alternately performed as illustrated in, e.g., FIG. 10.

More specifically, in the diagnosis process, the cooling operation is first performed as in the foregoing cooling process. In the cooling operation, air in the in-compartment space (13) is cooled to equal to or lower than a dew-point temperature, thereby dehumidifying the air. In the second embodiment, a predetermined time is set in the cooling operation timer (88). In the second embodiment, the defrosting operation is automatically executed after a lapse of the set time since the cooling operation is started.

The defrosting operation similar to that of the first embodiment is also performed in the second embodiment. During the defrosting operation, a defrosting end determinator (85) determines, as in the first embodiment, timing for terminating the defrosting operation. That is, when a temperature difference (EOS−EIS) of refrigerant on inlet and outlet sides of the evaporator (35) becomes greater than a reference value X2, the defrosting end determinator (85) terminates the defrosting operation. In the second embodiment, the cooling operation is resumed after the defrosting operation, and continues for the set time.

In the diagnosis process of the second embodiment as described above, airtightness of the trailer (11) is determined in such a manner that an execution time for the repeatedly-performed defrosting operation is compared between a current defrosting operation and a previous defrosting operation. Specifically, in the diagnosis process, the execution time (e.g., a time Δtd2 in FIG. 10(A)) for the current defrosting operation and the execution time (e.g., a time Δtd1 in FIG. 10(A)) for the previous defrosting operation are compared as illustrated in, e.g., FIG. 10(A).

Suppose that the sufficient airtightness of the trailer (11) of the second embodiment is ensured. In such a case, the humidity of air in the in-compartment space (13) is decreased every time the cooling operation and the defrosting operation are performed. Thus, if no external air substantially enters the trailer (11), the execution time for the defrosting operation is shortened depending on the course of the diagnosis process (see FIG. 10(A)).

In the second embodiment, the airtightness of the trailer (11) is determined based on the state in which the execution time for the defrosting operation is gradually shortened if no external air enters the trailer (11). Specifically, a counter (82a) of the diagnosis process executer (81) measures, at each operation, the execution time for the defrosting operation. A computer (82b) of the diagnosis process executer (81) compares the execution time (e.g., the time Δtd2) for the current defrosting operation with the execution time (e.g., the time Δtd1) for the previous defrosting operation. Referring to FIG. 10(A), if the execution time (time Δtd2) for the current defrosting operation is shorter than the execution time (time Δtd1) for the previous defrosting operation, the diagnosis process executer (81) displays an alert informing "no entering of external air (sufficient airtightness)" on a display (86).

On the other hand, if external air enters the trailer (11), the humidity in the in-compartment space (13) is less likely to be decreased even if the cooling operation and the defrosting operation are alternately repeated. In such a case, the amount of frost on the evaporator (35) is increased, and therefore the execution time for the defrosting operation is extended. Thus, in this case, the execution time (time Δtd2) for the current defrosting operation is, referring to, e.g., FIG. 10(B), not shorter than the execution time (time Δtd1) for the previous defrosting operation. Thus, in such a case, the diagnosis process executer (81) displays an alert informing "entering of external air (insufficient airtightness)" on the display (86). That is, in the second embodiment, if the comparison between the execution time for the current defrosting operation and the execution time for the previous defrosting operation shows that the execution time for the current defrosting operation is shorter than the execution time for the previous defrosting operation, it is determined as "entering of external air." If not (the execution time for the current defrosting operation is equal to or longer than the execution time for the previous defrosting operation), it is determined as "no entering of external air."

Variations of Second Embodiment

In the second embodiment, variations each having a configuration described below can be employed.

First Variation of Second Embodiment

Figure 11:
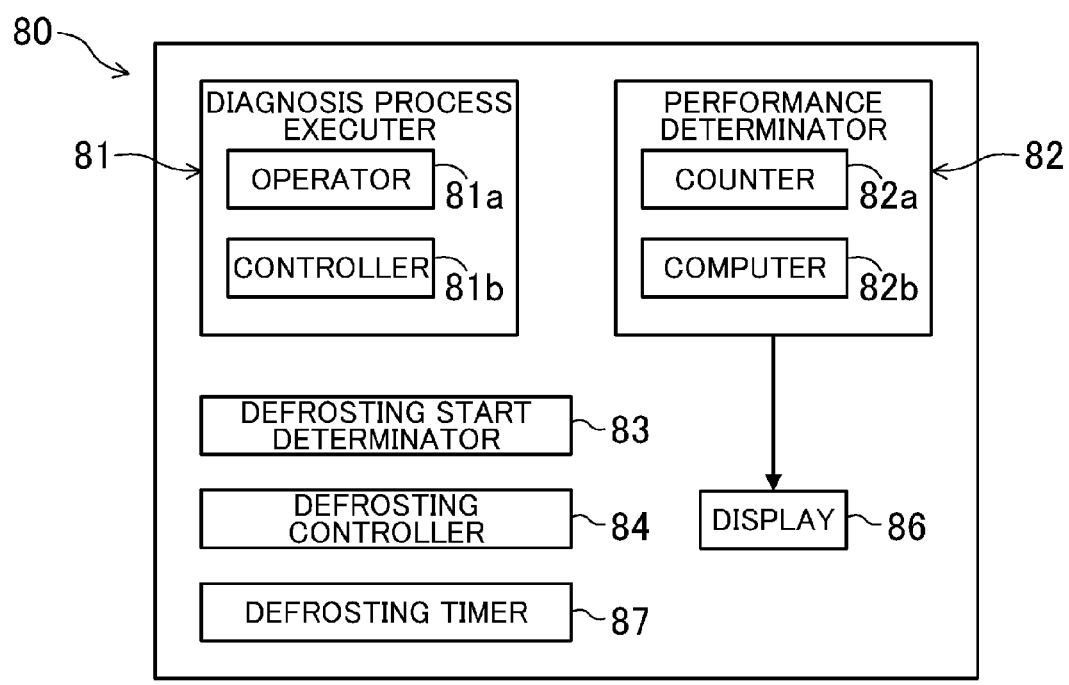
FIG. 11 is a schematic block diagram of a controller of a first variation of the second embodiment.
Figure 12:
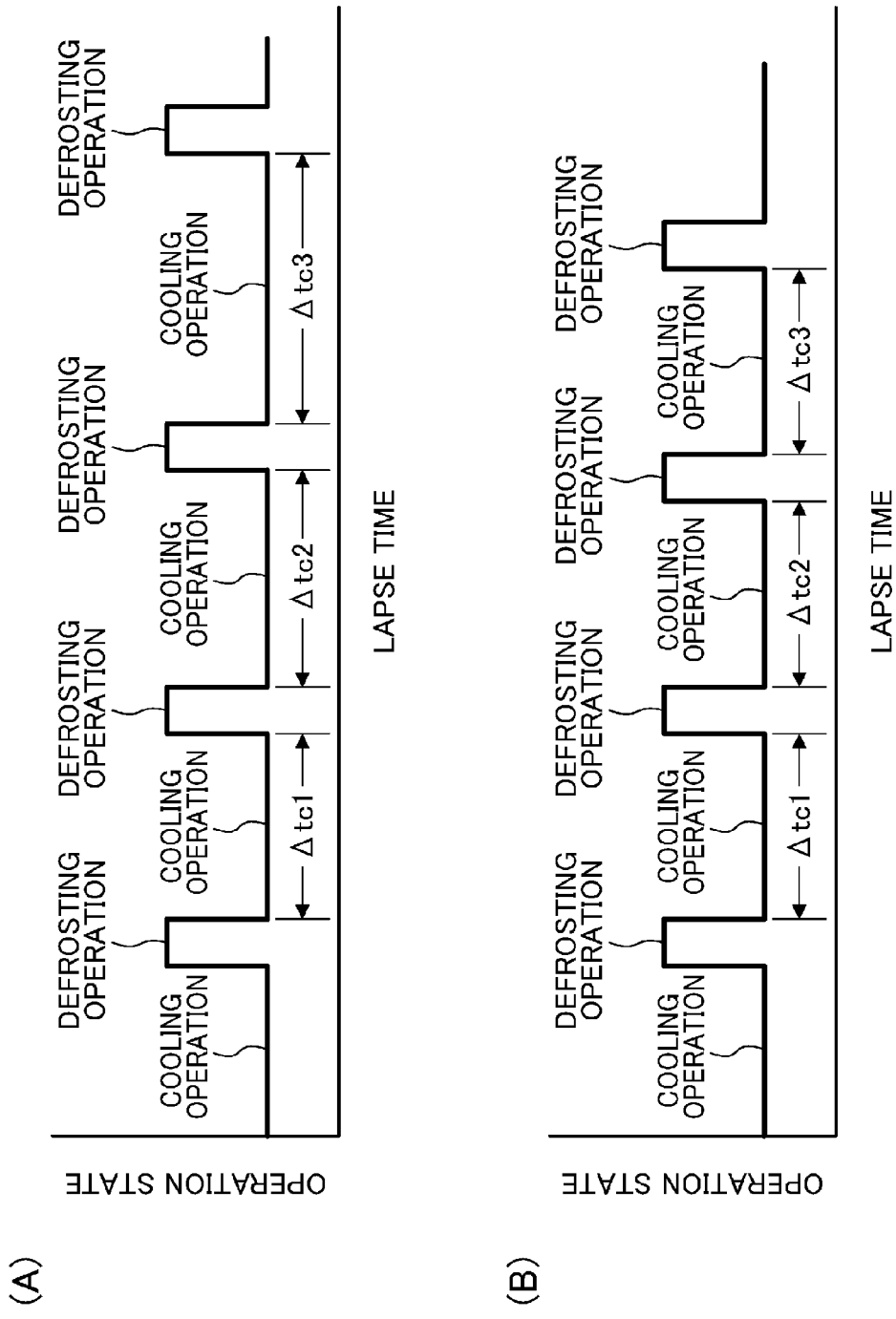
FIG. 12 is a time chart illustrating a relationship between an operation state and a lapse time in a diagnosis process of a first variation of the second embodiment.

In the second embodiment, the execution time for the cooling operation is the predetermined constant set time, and the defrosting operation is terminated based on the determination of the defrosting end determinator (85). Then, the airtightness of the trailer (11) is determined in such a manner that the execution time is compared between the defrosting operations. However, the execution time for the defrosting operation may be, referring to FIGS. 11 and 12, a predetermined constant set time, and the defrosting operation may be started based on the determination of the defrosting start determinator (83).

Specifically, in the present variation, a defrosting timer (87) is, in the controller (80) of the first embodiment, provided instead of the defrosting end determinator (85). In the present variation, a predetermined time is set in the defrosting timer (87). That is, in the present variation, the cooling operation is automatically executed after a lapse of the set time since the defrosting operation is started. During the cooling operation of the present variation, the defrosting start determinator (83) determines timing for starting the defrosting operation.

The diagnosis process executer (81) controls the refrigeration cycle unit (30) such that the diagnosis process similar to the normal cooling process described above is performed. That is, in the diagnosis process, the evaporator (35) performs the cooling operation for cooling the in-compartment space (13), and the defrosting operation is performed after the cooling operation. After the defrosting operation, the cooling operation is resumed. That is, in the diagnosis process, the cooling operation and the defrosting operation are alternately performed as illustrated in, e.g., FIG. 12.

More specifically, in the diagnosis process, the cooling operation is first performed as in the foregoing cooling process. In the cooling operation, air in the in-compartment space (13) is cooled to equal to or lower than the dew-point temperature, thereby dehumidifying the air. During the cooling operation, if the temperature difference (EOS−EIS) of refrigerant on the inlet and outlet sides of the evaporator (35) becomes less than a reference value X1, the defrosting start determinator (83) starts the defrosting operation. When the defrosting operation is started, the predetermined set time is counted by the defrosting timer (87). After a lapse of the set time, the defrosting operation is terminated, and the cooling operation is resumed.

In the diagnosis process of the present variation, the airtightness of the trailer (11) is determined in such a manner that the execution time for the repeatedly-performed cooling operation is compared between a current cooling operation and a previous cooling operation. Specifically, in the diagnosis process, the execution time (e.g., a time Δtc2 in FIG. 12(A)) for the current cooling operation and the execution time (e.g., a time Δtc1 in FIG. 12(A)) for the previous cooling operation are compared as illustrated in, e.g., FIG. 12(A).

Suppose that the sufficient airtightness of the trailer (11) of the present variation is ensured. In such a case, the humidity of air in the in-compartment space (13) is decreased every time the cooling operation and the defrosting operation are performed. Thus, if no external air substantially enters the trailer (11), the execution time for the cooling operation is extended depending on the course of the diagnosis process (see FIG. 12(A)). In the present variation, the airtightness of the trailer (11) is determined based on the state in which the execution time for the cooling operation is gradually extended if no external air enters the trailer (11).

Specifically, the counter (82a) of the diagnosis process executer (81) measures, at each operation, the execution time for the cooling operation. The computer (82b) of the diagnosis process executer (81) compares the execution time (e.g., the time Δtc2) for the current cooling operation with the execution time (e.g., the time Δtc1) for the previous cooling operation. Referring to FIG. 12(A), if the execution time (time Δtc2) for the current cooling operation is longer than the execution time (time Δtc1) for the previous cooling operation, the diagnosis process executer (81) displays an alert informing "no entering of external air (sufficient airtightness)" on the display (86).

On the other hand, if external air enters the trailer (11), the humidity in the in-compartment space (13) is less likely to be decreased even if the cooling operation and the defrosting operation are alternately repeated. In such a case, the amount of frost on the evaporator (35) is increased. Thus, the timing for starting the defrosting operation is delayed, and the execution time for the cooling operation is not extended. Consequently, in this case, the execution time (time Δtc2) for the current cooling operation is, referring to, e.g., FIG. 12(B), not longer than the execution time (time Δtc1) for the previous cooling operation. In such a case, the diagnosis process executer (81) displays an alert informing "entering of external air (insufficient airtightness)" on the display (86). That is, in the present variation, if the comparison between the execution time for the current cooling operation and the execution time for the previous cooling operation shows that the execution time for the current cooling operation is longer than the execution time for the previous cooling operation, it is determined as "entering of external air." If not (the execution time for the current cooling operation is equal to or shorter than the execution time for the previous cooling operation), it is determined as "no entering of external air."

Second Variation of Second Embodiment

The second embodiment and the first variation of the second embodiment may be combined together. That is, both of the defrosting start determinator (83) and the defrosting end determinator (85) may be provided. In addition, the cooling operation and the defrosting operation may be alternately performed, and the airtightness of the trailer (11) may be determined by the comparison between the execution time for the current cooling operation and the execution time for the previous cooling operation and the comparison between the execution time for the current defrosting operation and the execution time for the previous defrosting operation.

Third Embodiment of the Invention

Figure 13:
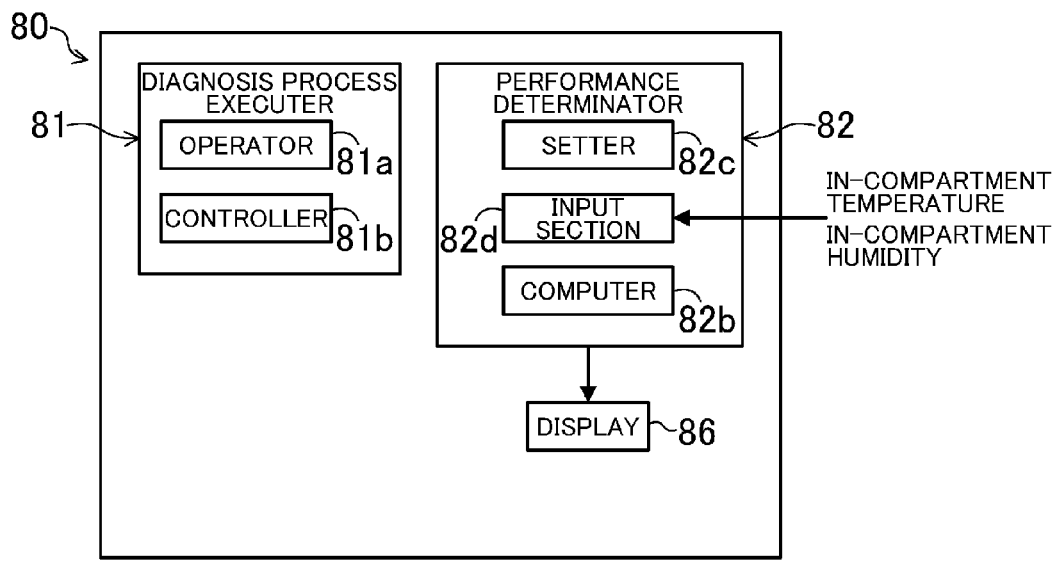
FIG. 13 is a schematic block diagram of a controller of a third embodiment.

A refrigerating apparatus (20) of a third embodiment of the present invention is different from those of the first and second embodiments in a method for a diagnosis process of a trailer (11). Specifically, a setter (82c), an input section (82d), and a computer (82b) are, referring to FIG. 13, provided in a diagnosis process executer (81) of a controller (80) of the third embodiment.

A rest operation period tset for temporarily stopping an evaporator (35) during a diagnosis process is set in the setter (82c). The temperature (in-compartment temperature) of air in an in-compartment space (13) and the humidity (in-compartment humidity) of air in the in-compartment space (13) are input to the input section (82d). The in-compartment temperature is detected by a suction temperature sensor (70), and the in-compartment humidity is detected by an in-compartment humidity sensor (72). Note that the in-compartment humidity sensor (72) is configured to detect the absolute humidity of in-compartment air. However, the in-compartment humidity sensor (72) may be configured to calculate a relative humidity. In such a case, in, e.g., the computer (82b), the absolute humidity of in-compartment air can be calculated based on the temperature and the relative humidity of the in-compartment air.

Figure 14:
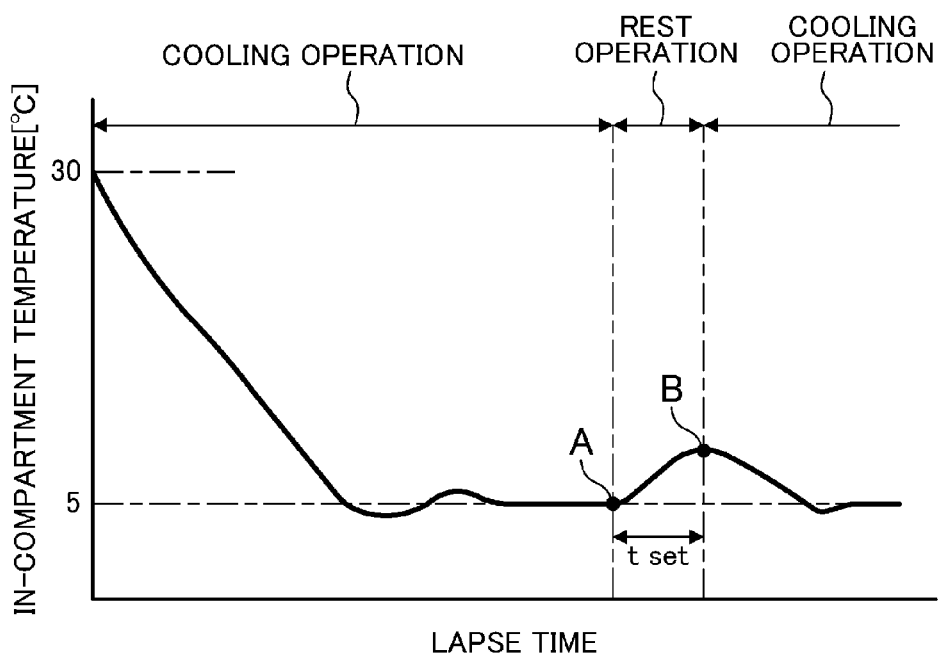
FIG. 14 is a graph illustrating a relationship between the temperature inside a cooling compartment and a lapse time in a diagnosis process of the third embodiment.

The diagnosis process of the third embodiment is executed as an initial process after the refrigerating apparatus (20) is mounted in the trailer (11). Referring to FIG. 14, in the diagnosis process, the rest operation is performed after a cooling operation, and then the cooling operation is resumed.

Specifically, when the diagnosis process is started, the cooling operation similar to those of the foregoing embodiments is first performed. That is, a refrigeration cycle is performed in a refrigerant circuit (40), and air in the in-compartment space (13) of the trailer (11) is cooled by an evaporator (35). In addition, in the cooling operation, an in-compartment fan (36) is operated to circulate air in the in-compartment space (13). By the cooling operation, in-compartment air having a temperature of, e.g., 30° C. is cooled to a target temperature (e.g., 5° C.).

When the temperature of in-compartment air converges to the target temperature as described above, the rest operation is executed by a controller (81b). In the rest operation, stoppage of a compressor (31) substantially stops a cooling function of the evaporator (35). Even through the cooling operation transitions to the rest operation, the in-compartment fan (36) is continuously operated.

The rest operation continues for the set period tset of the setter (82c). When the evaporator (35) is stopped during the rest operation, the temperature in the in-compartment space (13) is gradually increased. If a thermal insulating performance and airtightness of the trailer (11) are low, a gradient representing the increase in in-compartment air temperature during the set period tset is relatively large. Conversely, if the thermal insulating performance and the airtightness of the trailer (11) are high, the in-compartment air temperature is moderately increased during the set period tset. In addition, if the airtightness of the trailer (11) is low, a gradient representing an increase in in-compartment air humidity during the set period tset is relatively large. Conversely, if the trailer (11) has sufficient airtightness, the in-compartment air humidity is not increased during the set period tset.

A performance determinator (82) of the third embodiment determines a performance of the trailer (11) based on a change in in-compartment air temperature and in-compartment air humidity during the set period tset.

Specifically, an in-compartment temperature TA detected by the suction temperature sensor (70) and an in-compartment humidity HA detected by the in-compartment humidity sensor (72) are, at time of starting the rest operation, input to the input section (82d) of the performance determinator (82). Subsequently, the rest operation is terminated after a lapse of the set period tset. Then, at time (a point B illustrated in FIG. 14) of terminating the rest operation, an in-compartment temperature TB detected by the suction temperature sensor (70) and an in-compartment humidity HB detected by the in-compartment humidity sensor (72) are input to the input section (82d).

The computer (82b) calculates a difference (TB−TA) between the in-compartment temperature at a point A and the in-compartment temperature at the point B and a difference (HB−HA) between the in-compartment humidity at the point A and the in-compartment humidity at the point B. If the in-compartment humidity difference (HB−HA) is greater than a reference value X3 (e.g., 0) (i.e., if the in-compartment humidity is increased), it is regarded that external air enters the compartment during the set period tset, and the performance determinator (82) displays "entering of external air (insufficient airtightness)" on an display (86). On the other hand, if the in-compartment humidity difference (HB−HA) is equal to or less than the reference value X3 (e.g., 0), it is regarded that no external air enters the compartment during the set period tset, and the performance determinator (82) displays "no entering of external air (sufficient airtightness)" on the display (86).

Next, the performance determinator (82) determines whether or not the in-compartment temperature difference (TB−TA) is greater than a reference value X4. Even when it is determined as "no entering of external air" in the foregoing determination of the in-compartment humidity, if the in-compartment temperature difference (TB−TA) exceeds the reference value X4, the in-compartment air temperature is likely to increase regardless of no entering of external air. Thus, in this case, an "insufficient thermal insulating performance" is displayed on the display (86). If it is determined as "no entering of external air" in the foregoing determination of the in-compartment humidity, and the in-compartment temperature difference (TB−TA) is equal to or less than the reference value X4, no external air enters the compartment, and the gradient representing the increase in in-compartment temperature is small. Thus, in this case, a "sufficient thermal insulating performance" is displayed on the display (86).

Note that the reference values X3, X4 are experimentally- or theoretically-determined values. In particular, the reference value X4 is determined considering the amount of heat generated from the in-compartment fan (36) which is in operation.

Variation of Third Embodiment

In the third embodiment, a variation having a configuration described below can be employed.

As the variation of the third embodiment, the amount of external air entering the compartment can be quantitatively calculated by the computer (82b). Specifically, in the present variation, an outside-compartment humidity detector configured to calculate the humidity (absolute humidity in the present variation) of outside-compartment air is provided. Note that a humidity sensor may be provided outside the trailer (11) as the outside-compartment humidity detector, or the in-compartment humidity sensor (72) may detect, as the outside-compartment humidity detector, the in-compartment humidity in a pre-operation state before an inside of the trailer (11) is cooled.

In the present variation, if the humidity inside the compartment is increased during the foregoing set period tset, the computer (82b) can quantitatively obtain, considering the increase in in-compartment humidity and the humidity of external air, the amount of moisture entering the compartment and therefore the amount of external air entering the compartment. Thus, as in the third embodiment, the amount of external air entering the compartment can be well taken into consideration when the thermal insulating performance of the trailer (11) is evaluated, and therefore the thermal insulating performance can be quantitatively determined to some extent.

Other Embodiment

Each of the foregoing embodiments may have the following configurations.

Figure 15:
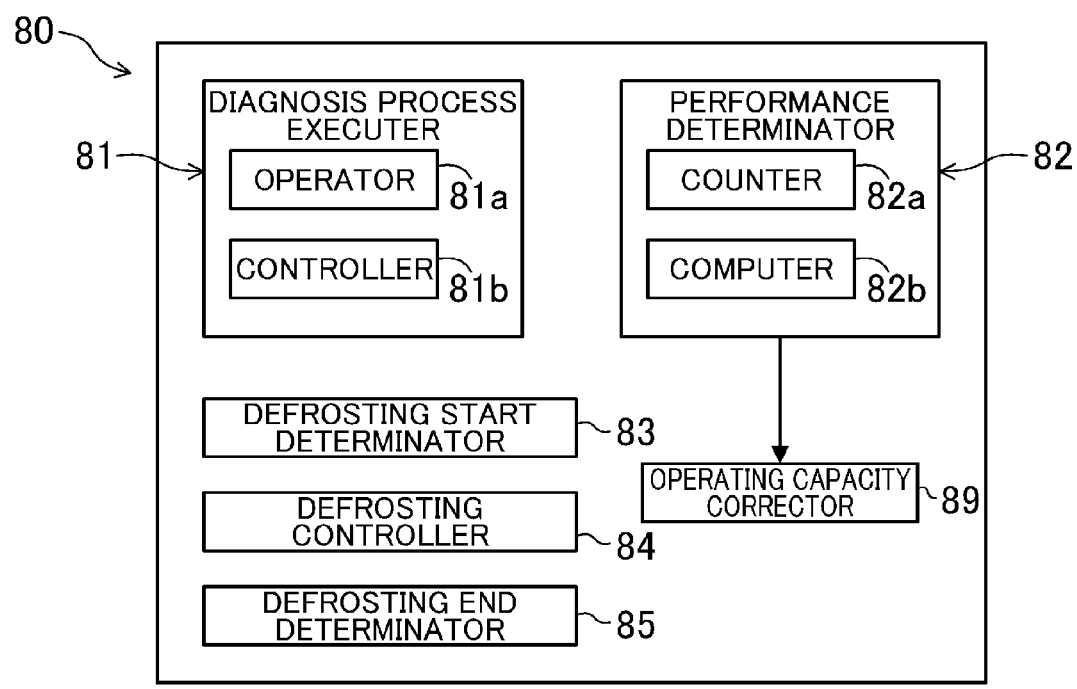
FIG. 15 is a schematic block diagram of a controller of other embodiment.

In each of the foregoing embodiments, when the performance determinator (82) determines the airtightness and the thermal insulating performance of the trailer (11), the determination results are displayed on the display (86) and are informed to, e.g., a user. However, referring to, e.g., FIG. 15, an operating capacity corrector (89) configured to correct the operating capacity of the refrigerating apparatus (20) may be provided in the performance determinator (82) instead of the display (86). Suppose that the performance determinator (82) determines that the airtightness and the thermal insulating performance of the trailer (11) are low. In such a case, the operating capacity corrector (89) may automatically increase the cooling capacity of the evaporator (35) by increasing the operating frequency of the compressor (31), or may correct the execution time for the defrosting operation to a longer time. According to such a configuration, even if there is a problem in performance of the trailer (11), a back-up process is automatically performed, thereby ensuring a cooling performance. Needless to say, the configuration may be provided, in which both of the display (86) and the operating capacity corrector (89) are provided.

In each of the foregoing embodiments, the performance of the refrigeration cycle unit (30) may be automatically diagnosed before the diagnosis process of the trailer (11). Specifically, it is determined whether or not there are defects in, e.g., the compressor (31), the expansion valve (37), and various sensors of the refrigeration cycle unit (30). If there is no defect in the foregoing components, the diagnosis process of the trailer (11) may be executed.

The diagnosis process of the trailer (11) may be performed in a method other than that described in each of the foregoing embodiments. Specifically, when the refrigeration cycle unit (30) is, in the diagnosis process, controlled to cool the inside of the compartment for a predetermined period, the performance (i.e., the entering of external air and the airtightness) of the trailer (11) can be determined based on a cooling capacity Qr of the refrigeration cycle unit (30) during the predetermined period and a change in state of in-compartment air during the predetermined period. That is, various sensors etc. are used to obtain the cooling capacity Qr of the refrigeration cycle unit (30) and the total Qair of latent heat and sensible heat processed in in-compartment air. Thus, the performance of the trailer (11) can be roughly determined by comparing the cooling capacity Qr and the total Qair.

The cooling capacity Qr of the refrigeration cycle unit (30) and the temperature that in-compartment air should reach by the cooling capacity Qr after a lapse of a predetermined time are calculated considering, e.g., the potential amount of heat entering the trailer (11), and the in-compartment temperature that in-compartment air should reach and an actually-detected in-compartment temperature are compared with each other. In such a manner, the performance of the trailer (11) can be roughly determined.

In the foregoing defrosting operation, the amount of drain water discharged to outside the trailer (11) after defrosting can be also measured. It can be determined, based on the amount of drain water, how much external air enters the trailer (11).

The refrigerating apparatus of each of the foregoing embodiments is configured to cool the inside of the trailer (11) serving as the cooling compartment. However, examples of the cooling compartment include, in addition to the trailer (11), a container used for transporting food etc. by ships, and a storage in which rice, flowers, etc. are stored. The present invention is applicable to such cooling compartments.

Note that the foregoing embodiments have been set forth merely for the purposes of preferred examples in nature, and are not intended to limit the scope, applications, and use of the invention.

INDUSTRIAL APPLICABILITY

As described above, the present invention is useful for the refrigerating apparatus which is attached to the opening of the cooling compartment in which the object(s) to be cooled is stored and which is configured to cool the inside of the cooling compartment.

DESCRIPTION OF REFERENCE CHARACTERS

10 Refrigerated Vehicle
11 Trailer (Cooling Compartment)
14 Opening
21 Casing Body
30 Refrigeration Cycle Unit
31 Compressor
32 Radiator
35 Evaporator 36 In-Compartment Fan
70 Suction Temperature Sensor (Temperature Detector)
72 In-Compartment Humidity Sensor (Humidity Detector)
81 Diagnosis Process Executer
82 Performance Determinator
83 Defrosting Start Determinator
85 Defrosting End Determinator

The invention claimed is:

1. A refrigerating apparatus, comprising:
a casing body attached to an opening formed at one end of a box-shaped cooling compartment so as to close the opening;
a refrigeration cycle unit including
a compressor and a radiator provided on an outer side of the cooling compartment relative to the casing body, and
an evaporator provided on an inner side of the cooling compartment relative to the casing body;
a diagnosis process executer configured to control the refrigeration cycle unit to execute a diagnosis process for diagnosing a performance of the cooling compartment; and
a performance determinator configured to determine airtightness of the cooling compartment based on the performance of the cooling compartment during the diagnosis process, wherein
the refrigeration cycle unit includes a defrosting start determinator configured to start a defrosting operation of the evaporator when an amount of frost on the evaporator exceeds a predetermined amount,
the diagnosis process executer is configured to perform, upon start of the diagnosis process, a cooling operation for cooling an inside of the cooling compartment by the evaporator, and
the performance determinator is configured to determine the airtightness of the cooling compartment based on a time Δt1 between a predetermined point after start of the cooling operation and a point at which the defrosting start determinator starts the defrosting operation.

2. The refrigerating apparatus of claim 1, further comprising:
a defrosting end determinator configured to terminate a defrosting operation of the evaporator when an amount of frost on the evaporator falls below a predetermined amount during the defrosting operation,
wherein the diagnosis process executer is configured to execute, upon start of the diagnosis process, a cooling operation for cooling an inside of the cooling compartment by the evaporator and then execute the defrosting operation, and
the performance determinator is configured to determine the airtightness of the cooling compartment based on a time Δt2 between a point at which the defrosting operation is executed and a point at which the defrosting end determinator terminates the defrosting operation.

3. The refrigerating apparatus of claim 1, further comprising:
a defrosting end determinator configured to terminate a defrosting operation of the evaporator when an amount of frost on the evaporator falls below a predetermined amount during the defrosting operation,
wherein the diagnosis process executer is configured to alternately execute a cooling operation for cooling an inside of the cooling compartment by the evaporator and the defrosting operation such that the defrosting operation is performed after the cooling operation and the cooling operation is resumed when the defrosting end determinator terminates the defrosting operation, and
the performance determinator is configured to determine the airtightness of the cooling compartment by comparing between an execution time for a predetermined defrosting operation and an execution time for a defrosting operation previous to the predetermined defrosting operation.

4. The refrigerating apparatus of claim 1, wherein
the refrigeration cycle unit includes a temperature detector configured to detect a temperature of air inside the cooling compartment,
the diagnosis process executer is configured to perform a cooling operation for cooling an inside of the cooling compartment to a predetermined temperature by the evaporator, perform a rest operation for stopping the evaporator after the cooling operation, and resume the cooling operation after a lapse of a predetermined set time since the rest operation is started, and
the performance determinator is configured to determine the performance of the cooling compartment based on a change in temperature inside the cooling compartment during the set time.

5. The refrigerating apparatus of claim 4, wherein
the refrigeration cycle unit includes a humidity detector configured to detect a humidity of air inside the cooling compartment, and
the performance determinator is configured to determine the airtightness of the cooling compartment based on a change in humidity during the set time.

6. The refrigerating apparatus of claim 1, wherein
the refrigeration cycle unit includes an in-compartment fan configured to circulate air in the cooling compartment such that the air in the cooling compartment passes through the evaporator, and
the diagnosis process executer is configured to operate the in-compartment fan in the cooling operation of the diagnosis process.

7. The refrigerating apparatus of claim 1, wherein the cooling compartment is a trailer mounted in a refrigerated vehicle.

8. A refrigerating apparatus, comprising:
a casing body attached to an opening formed at one end of a box-shaped cooling compartment so as to close the opening;
a refrigeration cycle unit including
a compressor and a radiator provided on an outer side of the cooling compartment relative to the casing body, and
an evaporator provided on an inner side of the cooling compartment relative to the casing body;
a diagnosis process executer configured to control the refrigeration cycle unit to execute a diagnosis process for diagnosing a performance of the cooling compartment;
a performance determinator configured to determine airtightness of the cooling compartment based on the performance of the cooling compartment during the diagnosis process; and
a defrosting start determinator configured to start a defrosting operation of the evaporator when an amount of frost on the evaporator exceeds a predetermined amount,
wherein the diagnosis process executer is configured to alternately execute a cooling operation for cooling an inside of the cooling compartment by the evaporator and the defrosting operation such that the defrosting start determinator starts the defrosting operation after the cooling operation and then the cooling operation is resumed, and the performance determinator is configured to determine the airtightness of the cooling compartment by comparing between an execution time for a predetermined cooling operation and an execution time for a cooling operation previous to the predetermined cooling operation.

* * * * *